United States Patent
Vasanad et al.

(10) Patent No.: US 12,399,751 B2
(45) Date of Patent: Aug. 26, 2025

(54) VIRTUAL EDGE DEVICES

(71) Applicant: Oracle International Corporation, Redwood Shores, CA (US)

(72) Inventors: Naren Shivashankar Vasanad, Fremont, CA (US); Pradeep Kumar Vijay, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/540,650

(22) Filed: Dec. 14, 2023

(65) Prior Publication Data
US 2024/0111602 A1    Apr. 4, 2024

Related U.S. Application Data

(63) Continuation of application No. 17/875,249, filed on Jul. 27, 2022, now Pat. No. 11,915,059.

(51) Int. Cl.
| | |
|---|---|
| *G06F 15/16* | (2006.01) |
| *G06F 9/50* | (2006.01) |
| *G06F 9/54* | (2006.01) |
| *H04L 29/06* | (2006.01) |

(52) U.S. Cl.
CPC .......... *G06F 9/5072* (2013.01); *G06F 9/5077* (2013.01); *G06F 9/5083* (2013.01)

(58) Field of Classification Search
CPC .... G06F 9/5072; G06F 9/5077; G06F 9/5083; H04L 41/12; H04L 41/342; H04L 41/22; H04L 41/5077
USPC ......................................................... 709/223
See application file for complete search history.

(56) References Cited

U.S. PATENT DOCUMENTS

| | | | |
|---|---|---|---|
| 8,613,070 B1 | 12/2013 | Borzycki et al. | |
| 10,187,323 B2* | 1/2019 | Laplanche | G06F 9/5072 |
| 10,404,613 B1 | 9/2019 | Brooker et al. | |
| 11,032,164 B1* | 6/2021 | Rothschild | H04L 41/40 |
| 11,201,794 B1* | 12/2021 | Guo | H04L 43/0864 |
| 11,271,807 B1* | 3/2022 | Rothschild | H04L 41/0895 |
| 11,314,601 B1* | 4/2022 | Natanzon | G06F 11/3466 |

(Continued)

OTHER PUBLICATIONS

U.S. Appl. No. 17/531,566, Notice of Allowance mailed on Mar. 21, 2023, 10 pages.

(Continued)

*Primary Examiner* — Hamza N Algibhah
(74) *Attorney, Agent, or Firm* — Kilpatrick Townsend & Stockton LLP

(57) ABSTRACT

Techniques discussed herein relate to provisioning one or more virtual cloud-computing edge devices at a physical cloud-computing edge device. A manifest may be generated/utilized to specify various attributes of the virtual cloud-computing edge devices to be executed at a physical cloud-computing edge device. A first set of resources corresponding to a first virtual cloud-computing edge device may be obtained from memory of a centralized cloud-environment and provisioned at the first virtual cloud-computing edge device. Similar operations may be performed with respect to a second virtual cloud-computing edge device. The techniques described herein split the physical edge device into multiple virtual device resources that can be utilized in combination or separately to extend the functionality and versatility of the physical edge device.

19 Claims, 15 Drawing Sheets

(56) References Cited

U.S. PATENT DOCUMENTS

| | | | |
|---|---|---|---|
| 11,349,710 B1* | 5/2022 | Nelson | C07K 16/2803 |
| 11,509,715 B2* | 11/2022 | Rafey | G06N 20/00 |
| 11,573,816 B1* | 2/2023 | Featonby | H04L 67/10 |
| 11,579,911 B1* | 2/2023 | Santos | G06F 9/45558 |
| 11,647,103 B1* | 5/2023 | Pinho | H04L 69/22 709/224 |
| 11,683,220 B2 | 6/2023 | Maheshwari et al. | |
| 11,693,669 B2* | 7/2023 | Kamath | G06F 9/45558 713/1 |
| 11,722,867 B2* | 8/2023 | Doken | H04L 41/5051 709/224 |
| 11,743,344 B1* | 8/2023 | Sivaswamy | G06F 9/5066 709/224 |
| 11,915,059 B2 | 2/2024 | Vasanad et al. | |
| 11,936,757 B1* | 3/2024 | Benny | H04L 61/4511 |
| 12,106,085 B2* | 10/2024 | Patil | G06F 9/45558 |
| 2011/0035747 A1* | 2/2011 | Machida | G06F 8/63 718/100 |
| 2012/0303818 A1* | 11/2012 | Thibeault | H04L 67/289 709/226 |
| 2013/0332927 A1 | 12/2013 | Tang et al. | |
| 2015/0046591 A1* | 2/2015 | Zhu | H04L 67/1001 709/226 |
| 2015/0142878 A1* | 5/2015 | Hebert | H04L 67/10 709/203 |
| 2017/0244647 A1* | 8/2017 | Jin | G06F 9/45504 |
| 2018/0103088 A1 | 4/2018 | Blainey et al. | |
| 2019/0007339 A1 | 1/2019 | Bao et al. | |
| 2019/0036687 A1 | 1/2019 | Raza et al. | |
| 2019/0042319 A1* | 2/2019 | Sood | G06F 21/74 |
| 2019/0064787 A1* | 2/2019 | Maturana | G05B 23/0227 |
| 2019/0065545 A1* | 2/2019 | Hazel | G06F 16/2282 |
| 2019/0129745 A1* | 5/2019 | Wang | G06F 9/45558 |
| 2019/0266170 A1* | 8/2019 | Hazel | G06F 16/221 |
| 2019/0324786 A1* | 10/2019 | Ranjan | G06F 9/45558 |
| 2020/0073649 A1* | 3/2020 | Viana | G06F 9/45504 |
| 2020/0351337 A1* | 11/2020 | Calmon | G06F 9/45558 |
| 2021/0067599 A1* | 3/2021 | Gill | H04L 67/53 |
| 2021/0136178 A1* | 5/2021 | Casey | G06F 9/505 |
| 2021/0144517 A1* | 5/2021 | Guim Bernat | H04L 9/3247 |
| 2021/0149648 A1* | 5/2021 | Velammal | G06N 20/00 |
| 2021/0273987 A1* | 9/2021 | You | H04L 67/02 |
| 2021/0303364 A1* | 9/2021 | Chiu | G06F 9/547 |
| 2022/0004410 A1* | 1/2022 | Chen | G06F 9/45533 |
| 2022/0116455 A1* | 4/2022 | Raghunath | G06F 9/5027 |
| 2022/0188569 A1* | 6/2022 | Ananthanarayanan | G06V 20/58 |
| 2022/0209992 A1* | 6/2022 | Ritchie | H04L 41/40 |
| 2022/0256647 A1* | 8/2022 | Salmasi | H04L 67/34 |
| 2022/0327003 A1* | 10/2022 | Shankar | G06F 9/505 |
| 2022/0327007 A1 | 10/2022 | Adogla et al. | |
| 2022/0357975 A1* | 11/2022 | Huang | G06F 9/45545 |
| 2022/0377146 A1 | 11/2022 | Shankar | |
| 2022/0394084 A1* | 12/2022 | Chen | H04L 67/10 |
| 2023/0011628 A1 | 1/2023 | Hurley et al. | |
| 2023/0049501 A1 | 2/2023 | Xu et al. | |
| 2023/0177349 A1* | 6/2023 | Balakrishnan | H04L 67/10 706/25 |
| 2023/0231903 A1* | 7/2023 | Zeng | H04L 67/1008 709/223 |
| 2023/0269126 A1* | 8/2023 | Parthasarathy | G06F 9/5027 709/223 |
| 2023/0315438 A1* | 10/2023 | Suto | G06F 8/65 717/168 |
| 2023/0315505 A1* | 10/2023 | Erukulla | G06F 9/4416 718/1 |
| 2024/0028414 A1* | 1/2024 | Vasanad | G06F 9/5077 |

OTHER PUBLICATIONS

U.S. Appl. No. 17/565,337, Notice of Allowance mailed on May 11, 2023, 11 pages.

U.S. Appl. No. 17/875,249, Notice of Allowance mailed on Nov. 24, 2023, 11 pages.

U.S. Appl. No. 18/331,900, "Non-Final Office Action", Aug. 26, 2024, 9 pages.

* cited by examiner

VIRTUAL EDGE DEVICES

CROSS-REFERENCE TO RELATED APPLICATION

This application is a continuation of U.S. Non-Provisional patent application Ser. No. 17/875,249, filed Jul. 27, 2022, entitled "VIRTUAL EDGE DEVICES," the entire contents of which are incorporated herein by reference.

BACKGROUND

In cloud computing, processing and storage is generally performed by one or more service providers implemented at a centralized location. Data can be received from customers at the centralized location, processed there, and then the processed (or other) data can be transmitted back to customers. However, having a centralized location for cloud infrastructure components may not be ideal in various scenarios. For example, when there are hundreds or thousands of Internet of Things (IoT) devices transmitting data to the central servers, and especially when those IoT devices are not geographically close to the cloud infrastructure computing devices, conventional centralized systems are not ideal. These IoT devices may be considered on the "edge," as in they are not close to the central servers.

Additionally, there may be other instances when the centralized location for cloud components is less than ideal. For example, if the data is collected (e.g., by IoT devices) in a disconnected region or a location with no Internet connectivity (e.g., remote locations). Current centralized cloud computing environments may not meet time sensitivity requirements when streaming data due to the inherent latency of their wide-area network connections. Remotely generated data may need to be processed more quickly (e.g., to detect anomalies) than conventional centralized cloud computing systems allow. A centralized workflow manager may be suboptimal for managing workflows at geographically remote devices.

In light of these considerations, it may be desirable to provision a device to operate at a remote location separate from the centralized cloud computing environment. The resources (e.g., object storage buckets, virtual machine images, etc.) provisioned on this device may enable its operation. At least some of those resources that may be obtainable from a user's cloud computing tenancy and/or compartment within the centralized cloud-computing environment. Some users may utilize multiple tenancies and/or compartments. Conventional techniques for enabling access to these resources are error prone and may lead to unnecessary delay in the provisioning process.

BRIEF SUMMARY

Techniques are provided (e.g., a method, a system, non-transitory computer-readable medium storing code or instructions executable by one or more processors) for managing and/or provisioning one or more virtual edge devices at a cloud-infrastructure edge computing device (e.g., a computing device configured to deliver computing and storage at remote locations separate from the centralized data center and lacking a public/private network connection, also referred to herein as an "edge device," for brevity).

One embodiment is directed to a method. The method may comprise receiving, by a cloud-computing device, a user request comprising a manifest specifying a plurality of virtual cloud-computing edge devices to be executed at a physical cloud-computing edge device. In some embodiments, the physical cloud-computing edge device may be configured to selectively execute within an isolated computing environment having no access to a public network while executing within the isolated computing environment. The method may further comprise obtaining, from memory of a centralized cloud-computing environment, a first set of resources corresponding to a first virtual cloud-computing edge device of the plurality of virtual cloud-computing edge devices to be executed at the cloud-computing edge device. The method may further comprise provisioning the first virtual cloud-computing edge device with the first set of resources in accordance with the manifest. The method may further comprise obtaining, from memory of the centralized cloud-computing environment, a second set of resources corresponding to a second virtual cloud-computing edge device of the plurality of virtual cloud-computing edge devices to be executed at the cloud-computing edge device. The method may further comprise provisioning the second virtual cloud-computing edge device with the second set of resources in accordance with the manifest.

In some embodiments, the first virtual cloud-computing edge device is associated with a first compartment of the centralized cloud-computing environment. Likewise, in some embodiments, the second virtual cloud-computing edge device is associated with a second compartment of the centralized cloud-computing environment.

In some embodiments, the first cloud-computing edge device is one of a plurality of virtual cloud-computing edge devices corresponding to a plurality of physical cloud-computing edge device, each of the plurality of virtual cloud-computing devices being configured to operate as a computing cluster within the isolated computing environment.

In some embodiments, the second cloud-computing edge device is restricted from communicating with the plurality of virtual cloud-computing edge devices of the computing cluster. In some embodiments, the first set of resources differs from the second set of resources.

In some embodiments, the first virtual cloud-computing edge device is associated with a first tenancy of the centralized cloud-computing environment while the second virtual cloud-computing edge device is associated with a second tenancy of the centralized cloud-computing environment. The first and second tenancy (or compartment) may be different tenancies (or compartments) or the same tenancy (or compartment).

In some embodiments, the method may further comprise receiving a request to migrate one or more resources of the first virtual cloud-computing edge device to the centralized cloud-computing environment. In some embodiments, the method may further comprise configuring a second computing device of the centralized cloud-computing environment to comprise a third set of resources corresponding to the first set of resources of the first virtual cloud-computing edge device. In some embodiments, the method may further comprise establishing a communication channel between the first virtual cloud-computing edge device and the second computing device of the centralized cloud-computing environment, In some embodiments, the method may further comprise executing a set of migration operations to migrate metadata of the first set of resources from the first virtual cloud-computing edge device to the centralized cloud-computing environment. In some embodiments, migrating the metadata may configure the third set of resources to operate as the second set of resources from within the centralized cloud-computing environment.

In some embodiments, a computing device is disclosed. The computing device may be configured with one or more processors and one or more memories configured with executable instructions that, when executed by the one or more processors, cause the computing device to perform the method disclosed in the paragraph above.

Some embodiments disclose a non-transitory computer-readable storage medium comprising computer-executable instructions that, when executed with one or more processors of a computing device, cause the computing device to perform the methods disclosed herein.

DETAILED DESCRIPTION

Figure 1:
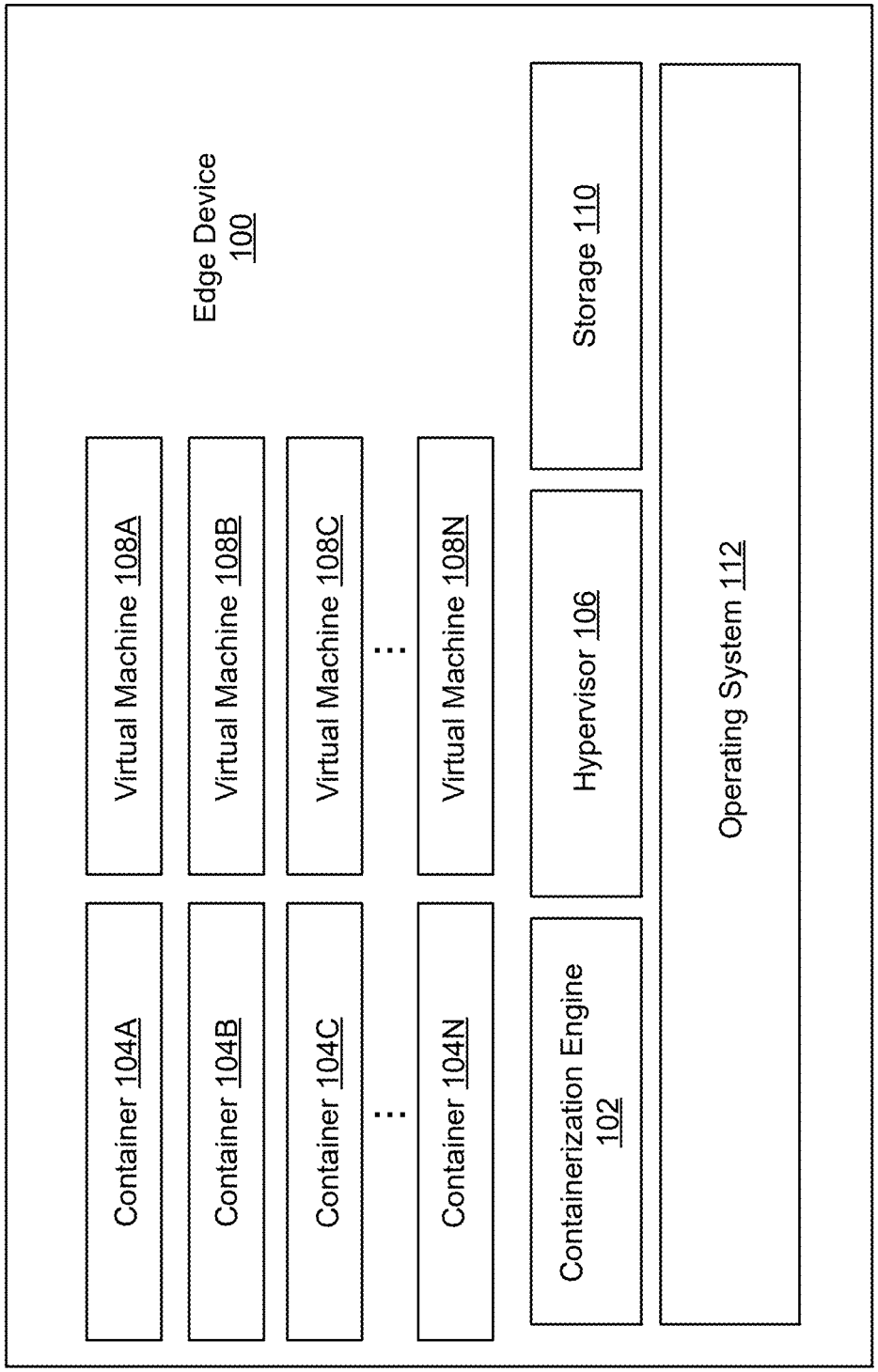
FIG. 1 is a block diagram of an example high-level architecture for a cloud infrastructure edge computing device, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

In some examples, a cloud-integrated edge service (e.g., implemented in a cloud-infrastructure edge computing device, also referred to as an "edge device," for brevity) may be integral in addressing the desire to run time-sensitive cloud infrastructure application outside of a centralized data center (e.g., a datacenter of a cloud infrastructure service provider). Such an edge device may deliver computing and storage at the edge and/or in disconnected locations (e.g., remote locations separate from the centralized data center and lacking a public/private network connection (e.g., an Internet connection, a VPN connection, a dedicated connection, etc.) to enable low-latency processing at or near the point of data generation and ingestion. In some instances, a fleet of portable (which may be ruggedized for protection) server nodes (e.g., a fleet of edge devices) may be configured to physically bring the cloud infrastructure service to remote locations where cloud technology has been considered technologically infeasible or too cost prohibitive to implement.

To a customer (e.g., a user), the edge device can act as an extension of their cloud infrastructure: including virtual machines (VMs), containers, functions and data files, block volumes or object store services can also be delivered from the cloud infrastructure tenancy (e.g., a tenancy of the centralized cloud computing environment) with little to no modifications, and the user experience may remain unchanged from that of the centralized cloud computing experience. Additionally, the edge device may be configured to implement both a control plane and a data plane that are part of a cloud infrastructure service provider. The data plane can be configured to manage data storage, migration, processing, etc., while the control plan can be configured for controlling the various services and architecture components of the computing device. Once the edge computing device is properly connected to a customer computing device (e.g., via a local area network (LAN)), the customer may be able to utilize the IaaS service (or at least a subset of it) using the same SDK and API used with the centralized cloud service.

The edge computing device can be delivered to a customer in a pre-configured form, such that the only action that might be required of the customer is to connect the nodes to a network (e.g., a local/on premise network that is accessible by a user computing device), power them up, and/or log in. The device can be pre-configured in various ways based on customer preference/request, or it can be in one of various configurations (e.g., storage-centric, compute-centric, etc.). The node or cluster of nodes can be portable and is intended to be mobile—when moved and set up again (or used while in motion), the deployment continues to run from where it turned off (or continuously). The edge computing device can also monitor for wide area network (WAN) connection availability (e.g., the Internet or the like), and can synchronize customer and management data with the cloud once connected to a WAN.

Some potential use cases for the edge computing device include: storage and processing, compute and input/output (I/O) intensive applications, machine learning, remote computing, low latency database and analytics, and data collection and migration. More specifically, the edge device can be used for storage and processing of large volumes of images, video, audio, and IoT sensor data generated in environments where WAN connection is latent or unavailable (e.g., in remote areas, an oil off-shore platform, or the like). Once this data is pre-processed, filtered, compressed, and/or secured it may be transported or transferred to the cloud service provider, where it can be further processed by the centralized server (e.g., traditional cloud service provider). The device can also be used for compute and I/O intensive applications, where low latency is paramount, such as tactical reconnaissance or 5G communications. The device can also be used for machine learning, with models trained in the cloud and running in disconnected locations to improve efficiency, intelligence, and/or productivity in manufacturing, document management, transportation, oil and gas mining, and/or telecommunications. It can also be used for remote computing requiring elevated security and airtight containment of data. Additionally, the device can be used for low latency database and analytics workloads, with more applications optimized over time. Further, the device can also be used for data collection and migration of large sets of object and database management system (DBMS) data into a cloud service provider, e.g., at faster speeds and lower cost than a WAN transfer.

The edge device can natively support distributed cloud paradigms, where complex, multi-stage compute workflows can be separated into individual components, which in turn can be deployed to the infrastructure of the edge device, on premise, and/or in the cloud. An example of such distributed workflow is represented in the following scenario. Massive amounts of data can be collected by an edge computing node deployed on an airplane (e.g., a military jet) in a reconnaissance operation with no Internet access (e.g., a disconnected edge computing device), where this data is be pre-processed in near real time by a machine learning model previously trained by the cloud service provider that provided the edge device. Even the first pass of processing the data with the models can detect significant anomalies and can alert personnel immediately—for example, a bridge may be destroyed and therefore the troops should be rerouted. When the airplane lands, the edge computing device can be physically connected to a network (e.g., an edge station potentially deployed at the airstrip). The pre-processed, filtered, smaller dataset can be loaded for final processing to a cluster of edge computing device nodes at the edge station. The original edge computing device can be released and can be loaded on another (or the same) airplane, for example to support the next mission. When processing at the edge station is complete, a 3D map update can be issued for immediate use. Change sets can then be uploaded by the edge station cluster to a datacenter and can be used to build future models providing intelligent tactical forecasts to the reconnaissance operation, or the like.

It should be appreciated that the following techniques may be employed in a variety of contexts such as telecommunications, oil and gas, healthcare, hospitality, agriculture, transportation, and logistics, and the like.

Embodiments described herein address these and other problems, individually and collectively. Specifically, embodiments of the present disclosure provide for a cloud infrastructure edge computing device.

Edge Device Architecture

An edge computing device (sometimes referred to as "a cloud-computing edge device," a "cloud infrastructure edge computing device," or an "edge device," for brevity), extends a user's centralized cloud computing tenancy by physically putting customer infrastructure and platform services where data is generated—on the edge, on premise, or completely disconnected. Each deployment is created to address specific customer needs by provisioning VM instance images and data from the customer's centralized cloud tenancy. These workloads remain fully functional offline as the edge device adapts to the connection state, operates in harsh environmental conditions, and is ready to sync with the cloud whenever the connection is re-established.

FIG. 1 is a block diagram of an example high-level architecture for a cloud infrastructure edge computing device (e.g., edge device 100), according to at least one embodiment. An overview of the software and hardware component of the edge device 100 is provided below.

In some examples, the edge device 100 may include containerization engine 102 (e.g., Docker, Kubernetes, etc.) configured to implement one or more containers (e.g., corresponding to container(s) 104A, 104B, 104C, to 104N, collectively referred to as "container(s) 104"). A containerization engine (e.g., the containerization engine 102) may be container-orchestration system for automating computer application deployment, scaling, and management. In some embodiments, the containerization engine may be configured to provide OS-level virtualization to deliver software in packages called containers. These containers can be isolated from one another and utilize respective software, libraries, and configuration files, and can communicate with each other through well-defined channels. In some embodiments, service(s) 104 may include any suitable number of services (e.g., one or more). These services may implement at least some portion of centralized cloud capabilities. Each service may be stand-alone or operate as a distributed cluster. The edge device 100 may further include a hypervisor 106 configured to implement one or more virtual machines (e.g., virtual machines 108A, 108B, 108C, to 108N, collectively referred to as "virtual machine(s) 108" or "VMs 108").

In some examples, the edge device 100 includes storage 110 (e.g., object and/or block storage for storing local data). The edge device 100 includes operating system (OS) 112. In some embodiments, the OS 112 may be optimized for executing on an edge device and/or specific to execution on an edge device. OS 112 may be configured to manage the hardware of edge device 100 and supports a data plane of the services running on the edge device 100. The OS 112 may be configured to support a specific deployment type (e.g., a single edge device deployment, or a specific edge device cluster configuration). The OS 112 may be configured to secure the edge device by disallowing or otherwise blocking direct access by customers.

In some embodiments, the edge device 100 may include hardware such as any suitable number of central processing units (CPUs) and/or storage drives. For example, the edge device 100 depicted in FIG. 1 may have one, two, or more CPUs, with various numbers of cores per processing unit, and it may include any number of storage drives (e.g., 6.4 terabyte (TB) drives, or the like). As a non-limiting example, the edge device 100 may include block and/or object storage of any suitable size. The edge device 100 may include any suitable number of central processing units (CPUs), graphics processing units (GPUs), random access memory (RAM) of any suitable size, one or more ports (e.g., QSFP28, RJ45, dual ports, etc.), tamper-evident seals, or any suitable combination of the above components.

In some examples, the basic system functionality/services can be accessed via RESTful APIs have a custom load of software based on Linux. The virtual machine(s) 108 may individually be a Kernel-based Virtual Machines (KVM)

(e.g., a virtual machine managed by a virtualization module in the Linux kernel that allows the kernel to function as a hypervisor) and/or a hardware-based Virtual Machine (e.g., a virtual machine managed by a virtualizer, such as Quick EMUlator (QEMU), that can perform hardware virtualization to enable virtual machines to emulate of number of hardware architectures). Although storage 110 is represented as a separate component from the service(s) 104 and VM(s) 108, it can run as a container (e.g., container 104A) or in a VM (e.g., VM 108A). In some examples, it may be favorable to implement the storage 110 (e.g., object storage, block storage, etc.) as a container.

Figure 2:
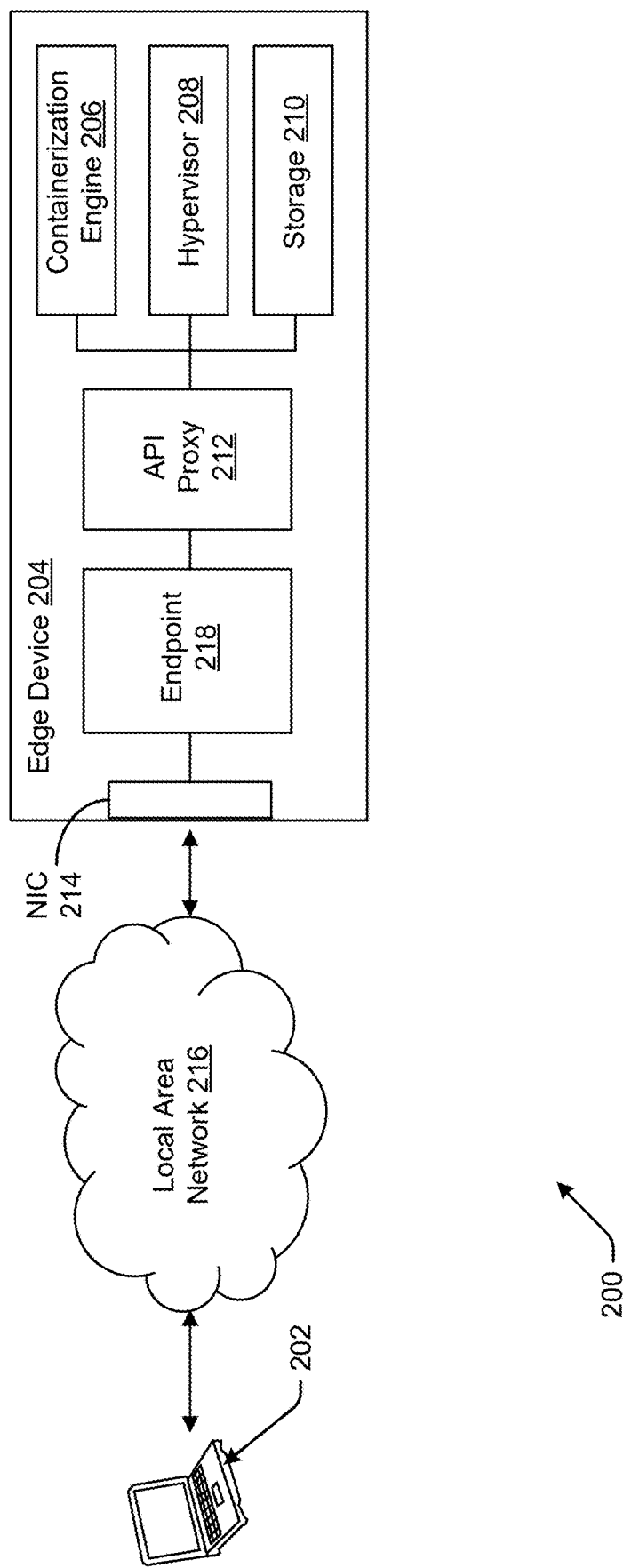
FIG. 2 is a block diagram of an example architecture for connecting a user computing device to a cloud infrastructure edge computing device, according to at least one embodiment.

FIG. 2 depicts an example architecture 200 for connecting the edge device described herein (e.g., edge device 100 from FIG. 1) to a computing device 202 (e.g., a user computing device). The computing device 202 can be any type of computing device including, but not limited to, a laptop computer, a desktop computer, or the like. The edge device 204 (an example of the edge device 100 of FIG. 1) may include containerization engine 206 (an example of the containerization engine 102 of FIG. 1), hypervisor 208 (an example of the hypervisor 106 of 1), and storage 210 (an example of the storage 110 of 1).

Additionally, as mentioned briefly above, the edge device 100 may include an API proxy 212 for managing the RESTful API calls received from the computing device 202. The API calls may enter the edge device 204 via network interface card (NIC) 214 that is internal to the edge device 204. The NIC 214 may be used to connect the edge device 204 to the computing device 202 via a local area network (e.g., the LAN 216). The API calls received by the NIC 214 may be transmitted to an exposed endpoint that may implement a Web server (e.g., endpoint 218). The web server can transmit the requests to the API proxy 212, which can route the requests to the appropriate service (e.g., containerization engine 206, hypervisor 208, and/or storage 210). The exposed endpoint/web server may also be configured to implement the lightweight console that is for use by the customer (e.g., the user interface displayed on the computing device 202).

The lightweight console can run within a web browser (e.g., Mozilla Firefox, or the like) on a laptop computer, desktop computer, or other network-accessible device (e.g., connected to the local area network (LAN 216)) that is network-connected to the edge device 204 (e.g., via a router, cable, etc.). The edge device 204 can expose the endpoint 218 for the console connection, and the web server can transmit data to the web browser of the computing device 202 over the LAN 216.

Figure 3:
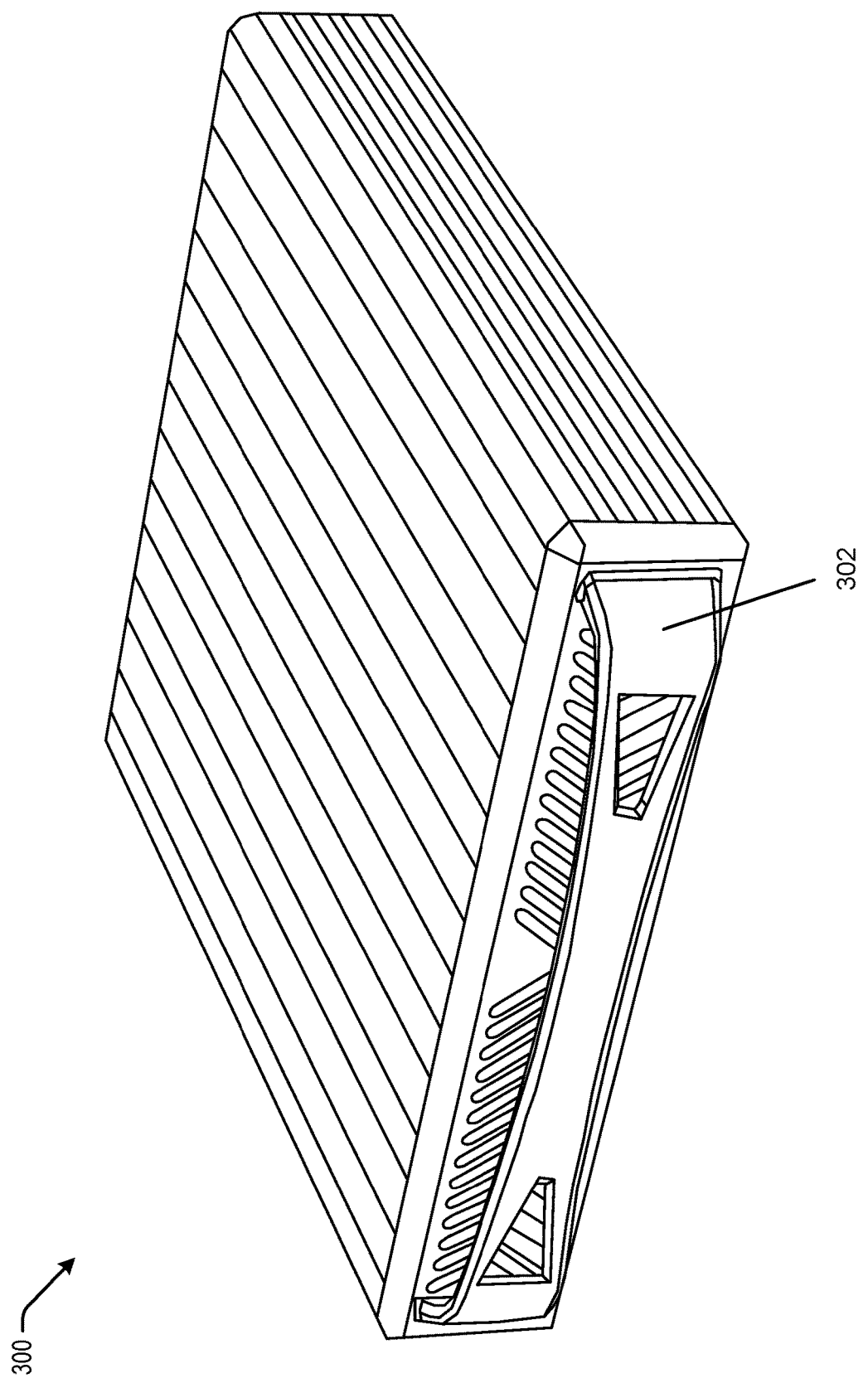
FIG. 3 is a block diagram of an example enclosure for a cloud infrastructure edge computing device, according to at least one embodiment.

FIG. 3 illustrates an example physical enclosure 300 of the edge device described herein (e.g., edge device 100 from FIG. 1). Various different form factors, shapes, colors, etc., can be employed to build a box (e.g., ruggedized) that can house the edge computing device. The physical enclosure can include handle 302, as shown, and may include tamper evident elements, so that if anyone breaks the enclosure open, it will be evident. In this way, the service provider that provides the edge computing device can ensure that the device is not modified. In some examples, the physical enclosure 300 may not be possible to open. However, in some cases, it might be possible, but it would require extreme measures.

Figure 4:
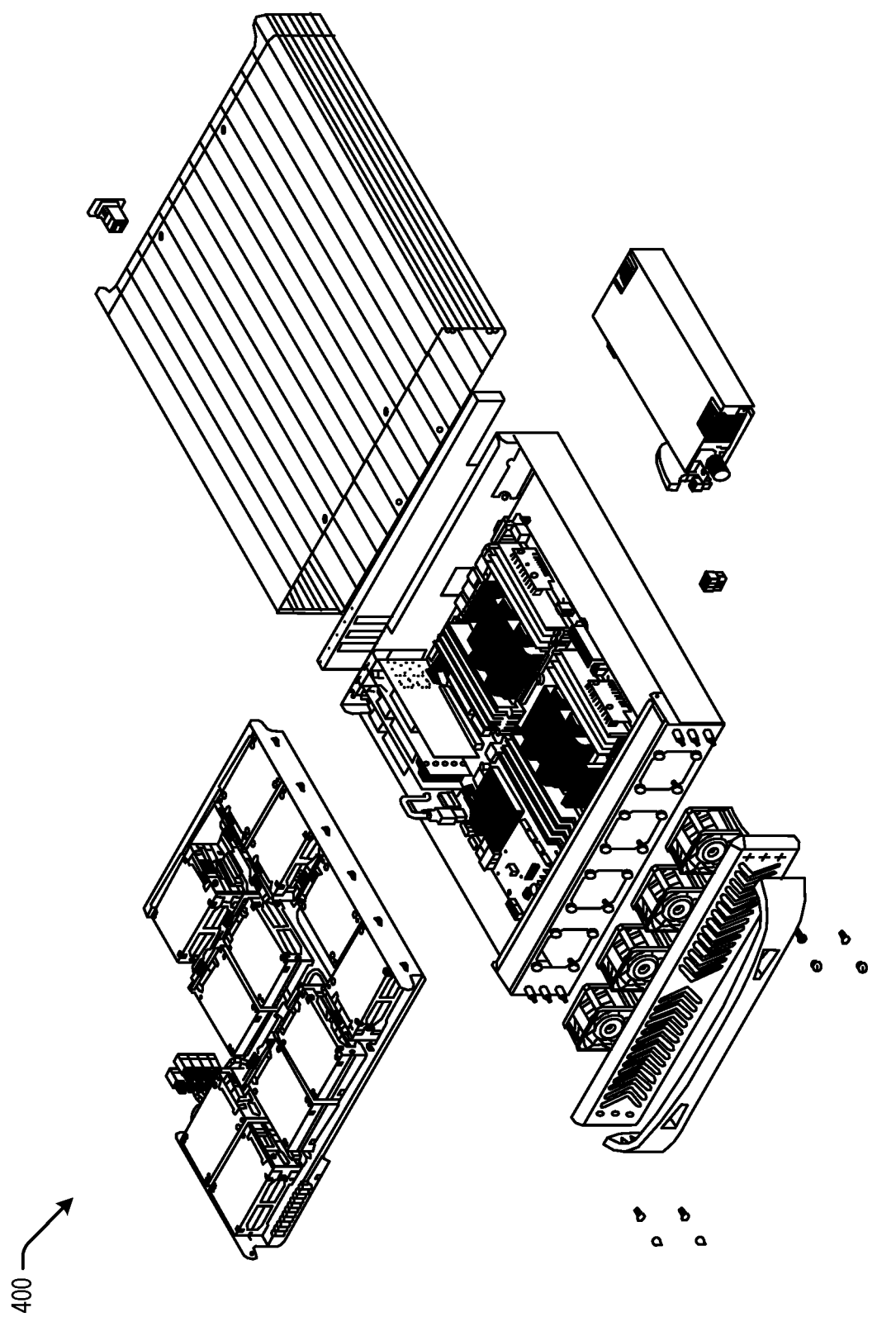
FIG. 4 illustrates an exploded view of the cloud infrastructure edge computing device described herein, in accordance with at least one embodiment.

FIG. 4 illustrates an exploded view of the cloud infrastructure edge computing device described herein (e.g., edge device 400, an example of the edge device 100 of FIG. 1), in accordance with at least one embodiment. The various components described with respect to FIGS. 1 and 2 can be communicatively attached to one or more motherboards and/or interface cards within the edge device 400. The illustrated configuration of components is but just one implementation. The specific locations of components shown is not intended to be limiting, and as noted, any configuration that is capable of implementing the functionality described herein is acceptable. Once the components are installed, the entire box can be closed, sealed, and locked with tamper-evident components.

The edge device 400 is a single enclosure. The enclosure may be designed to house any suitable number of serially attached SCSI (SAS) solid-state drives (SSDs) and all other components (e.g., CPU, memory, GPU, etc.) within the enclosure. The system may include one or more (e.g., 12 Gb) SAS connections to each drive in a fully contained sheet metal enclosure designed to fit within a standard 19" rack resting on an L bracket/shelf, on a table top or upright next to a desk with the use of a floor stand.

The system may include a tamper evident enclosure, front security plugs covering screws holding a front bezel in place with rear security interlock features. In some embodiments, the system may include a dual socket motherboard and any suitable amount of DRAM. In some embodiments, the system may include any suitable number (e.g., 2, 3, etc.) SATA SSDs, storage controllers, embedded network connections, one or more ports (e.g., dual ports, serial ports, etc.), one or more fans as part of a cooling system, or any suitable combination of the above.

As a non-limiting example, the edge device 400 may be made up of an external extruded aluminum case secured in the front with a vented bezel and rear panel only exposing I/O connections required for data transfer and management. Mounting can be designed to mount the any suitable motherboard, fans, and power supply.

Figure 5:
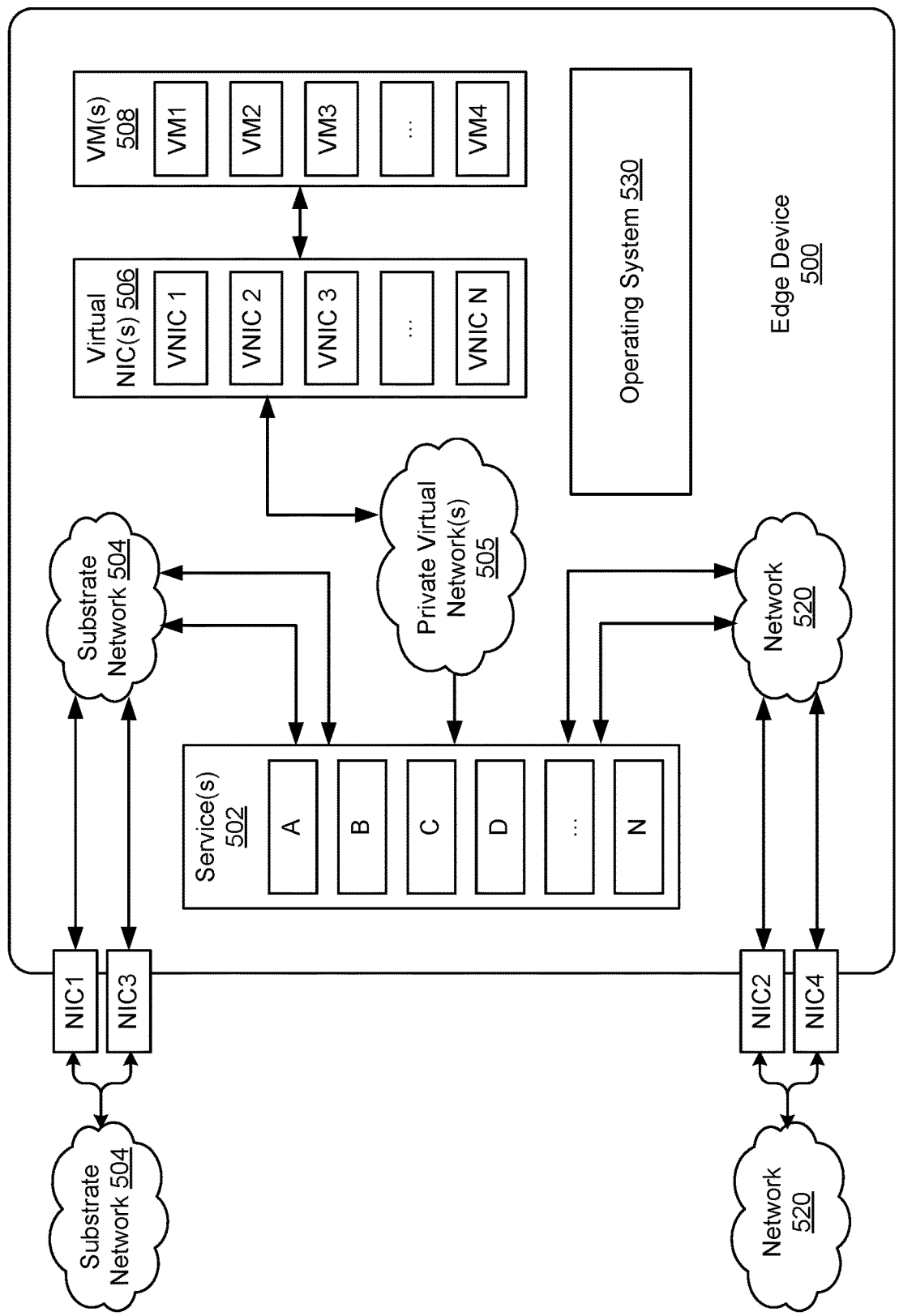
FIG. 5 is a block diagram of an example computer architecture of a cloud infrastructure edge computing device, according to at least one embodiment.

FIG. 5 is a block diagram of an example computer architecture of a cloud infrastructure edge computing device (e.g., edge device 500, an example of the edge devices 100 and 204, of FIGS. 1 and 2, respectively), according to at least one embodiment. The edge device 500 can be thought of as a cloud-integrated service that extends some or all of conventional cloud capabilities to locations that may not be accessible by or have access to cloud data centers. This can be achieved via portable ruggedized server nodes that provide cloud-like functionality in locations with no WAN connectivity. This allows customers to shift select cloud workloads to remote locations and enable intensive data processing operations close to the data ingestion points at the edge of their cloud infrastructure.

The edge device 500 may include any suitable number of services (e.g., service(s) 502). Each service may run as a container (e.g., a Docker container) locally on the edge device 500. The service(s) 502 may be communicatively connected via a substrate network 504 such that the communications between services are encrypted (e.g., in accordance with a security protocol such as MACsec). Each container may be assigned a substrate IP address (e.g., a static address) with which traffic can be addressed. In some embodiments, a security protocol (e.g., MACsec) is configured at provisioning time (e.g., before the edge device 500 is shipped to the user). The edge device's system software (including service(s) 502) may execute in the secure environments protected by boot security software (e.g., Trenchboot Secure Launch). Users may be restricted from accessing the secure environment and/or the substrate network 504. To minimize the resources used by these services, the service code may be compiled and saved to disk to decrease RAM space as well as decrease the CPU load on the edge device 500.

Some example services included in service(s) 502 may include a UI console service, an identity control plane (CP) service, an identity data plane (DP) service, a compute application programming interface (API) service, a compute worker thread service, a virtual network (VN) API service, a block storage API service, a function-as-a-service service, an events service, an object storage management service (e.g., implementing a storage platform such as Ceph Storage or the like), a compute DP service (e.g., an example of hypervisor 208 of FIG. 2), a VN DP service, a block storage management service, a function-as-a-service API service, a function-as-a-service load balancing (LB) service, a function-as-a-service process thread service, a distributed data store management service (e.g., etcd3), a dynamic host configuration protocol service, a domain name system service, a network time protocol (NTP) service, to name a few. Some example functionality provided by these services is discussed below.

By way of example, compute DP service may be configured (e.g., preconfigured and provisioned onto the edge device 500) to isolate the VM(s) 508 on the same hypervisor host. The compute DP service can utilize any suitable container engine (e.g., Docker container, MicroContainer, or the like) to isolate the VM(s) 508 on the same hypervisor host from each other. The compute DP service may utilize any suitable hypervisor (e.g., Quick EMUlator (QEMU), Kernel-based Virtual Machine (KVM), etc.) to provide virtual hardware emulation for VM(s) 508. In some embodiments, VNIC(s) 506 are attached to subnets of any suitable number of virtual networks (e.g., private virtual network(s) (PVN(s))) 505 and are assigned private Internet Protocol (IP) addresses. One VM may have multiple VNICs from different VCNs and different subnets. The maximum number of VNICs can be limited by predefined thresholds (e.g., configuration data referred to as "VM shape" that defines VNICs per VM count, VNIC shape, etc.). In some embodiments, the predefined thresholds are applied to each of the VM(s) 508. The subnets utilized by the VNIC(s) 506 may be isolated by VLANs. In some embodiments, some or all of the VNIC(s) 506 may be assigned public and/or private IP addresses. A public IP address is an address in the network 520, while a private IP address refers to an IP address of the PVN(s) 505.

In some embodiments, the edge device 500 implements various networking functionality via a number of services such as a network address translation (NAT) service, a dynamic host configuration protocol (DHCP) service, a domain name system (DNS) service, a network time protocol (NTP) service, a metadata service, and a public API service). The metadata service may provide initialization data and other metadata to all VM(s) 508. In some embodiments, DHCP service assigns private IP addresses to each of the VNIC(s) 506, each of the VM(s) 508 having one or more VNICS. DNS service may provide domain name resolution to VM(s) 508 on the edge device 500. NTP may provide time synchronization to VM(s) 508. In some embodiments, a public IP service executing as part of service(s) 502 may enable a VM to access a public API without assigning the VM a public IP and without configuring a service gateway.

In some embodiments, at least one of the VM(s) 508 may implement block (or object) storage. In some embodiments, the hypervisor associated with a virtual machine may include a library that enables the hypervisor to use a distributed data storage platform (e.g., Ceph). The library may utilize a protocol associated with that storage platform (e.g., RADOS Block Device (RBD) to facilitate storage of block-based data. The distributed data storage platform may be implemented over multiple virtual machines. In some embodiments, the distributed data storage platform supports making snapshots and copying block volumes. VM images and VM block volumes can be Ceph block devices. In some embodiments, the VM(s) implementing the distributed data storage platform will use system-reserved resources (e.g., eight CPU cores, or any subset of the total number of CPUs available on the edge device 500). For example in order to provision a boot volume, a block device image may be copied to a boot volume of the block device. The distributed data storage platform may use block devices that include multiple nodes for redundancy. If some node fails then the block device can continue to operate. In some embodiments, the distributed data storage platform (e.g., Ceph or the like), automatically recovers the block device data in case of a few node failures. Block storage may be utilized to store images for any suitable deployable resource. By way of example, an image may be utilized for launching VMs. In some embodiments, the image may correspond to a particular VM shape (e.g., a compute heavy VM, a GPU optimized VM, a storage VM, and the like).

Compute API service may support the following operations: 1) VM launch and terminate, 2) VM stop, start, reboot, 3) List VMs and/or get information on a specific VM, 4) obtain VM console history API, 5) obtain a VM snapshot, 6) attach/detach block volumes, and the like. In some embodiments, Compute API service can be used to call other services (e.g., compute DP service, identity DP service for authentication and authorization, etc.).

Some of the functionality of other services will be discussed in connection with FIG. 7. In general, although each service may not be discussed in detail herein, the general functionality provided by the service(s) 502 may include the functionality of cloud services provided by a remote cloud service provider. In some embodiments, the edge device 500 may be associated with a predefined region and/or realm such that some of the service(s) 502 may operate as if they were operating in a cloud computing environment, despite the fact they are operating on one or more local device(s) (one or more edge devices) as a single instance or as part of a distributed service that may have no or intermittent public network access to a cloud computing environment associated with the customer. A "region" refers to a geographic location at which a service center resides. A "realm" refers to a logical collection of regions. Realms may be isolated from each other and do not share data.

In some embodiments, the edge device 500 may provide any suitable number of virtual networks (e.g., PVN(s) 505) using compute, memory, and networking resources (e.g., virtual network interface card(s) (VNIC(s) 506)). A virtual network is a logical network that runs on top of a physical substrate network. Using the service(s) 502, one or more customer resources or workloads, such as virtual machines (e.g., virtual machine(s) (VM(s)) 508, executing a compute instance) can be deployed on these private virtual networks. Any suitable combination of VM(s) 508 can execute functionality (e.g., a compute instance, storage, etc.) which is individually accessible through a virtual NIC (e.g., one of the virtual NIC(s) 506). Each VM that is part of a PVN is associated with a VNIC that enables the VM (e.g., a compute instance) to become a member of a subnet of the PVN. The VNIC associated with a VM facilitates the communication of packets or frames to and from the VM. A VNIC can be associated with a VM when the VM is created. PVN(s) 505 can take on many forms, including peer-to-peer networks, IP networks, and others. In some embodiments, substrate network traffic of the service(s) 502 may be encrypted and/or isolated (e.g., by virtue of different PVNs or subnets) from network traffic of one or more the VM(s) 508 executing on the edge device 500.

The edge device 500 thus provides infrastructure and a set of complementary services that enable customers to build and run a wide range of applications (e.g., compute instances), services, and/or storage in a highly available, physically local, and virtual hosted environment. The customer does not manage or control the underlying physical resources provided by the edge device 500 but has control over expanding or reducing virtual machines (e.g., compute instances, virtual NICs, block or object storage, etc.), deploying applications to those virtual machines, and the like. All workloads on the edge device 500 may be split into different CPU sets (e.g., VM and non-VM). One set (e.g., non-VM such as workloads performed by the service(s) 502) may utilize a subset of CPU cores (e.g., 8) of the edge device 500, while the other set (e.g., VM workloads performed by the VM(s).

The edge device 500 may be communicatively connected to a user device (e.g., the computing device 202 of FIG. 2) via one or more network interfaces (e.g., NIC2 and/or NIC 4) and network 520 to interact and/or manage the VM(s) 508. In certain embodiments, a lightweight console can be provided at the user device via a web-based user interface that can be used to access and manage the edge device 500. In some implementations, the console is a web-based application (e.g., one of the service(s) 502) provided by the edge device 500.

FIG. 5 depicts a single edge device. However, it should be appreciated that more than one edge device may be utilized as a distributed computing cluster.

Figure 6:
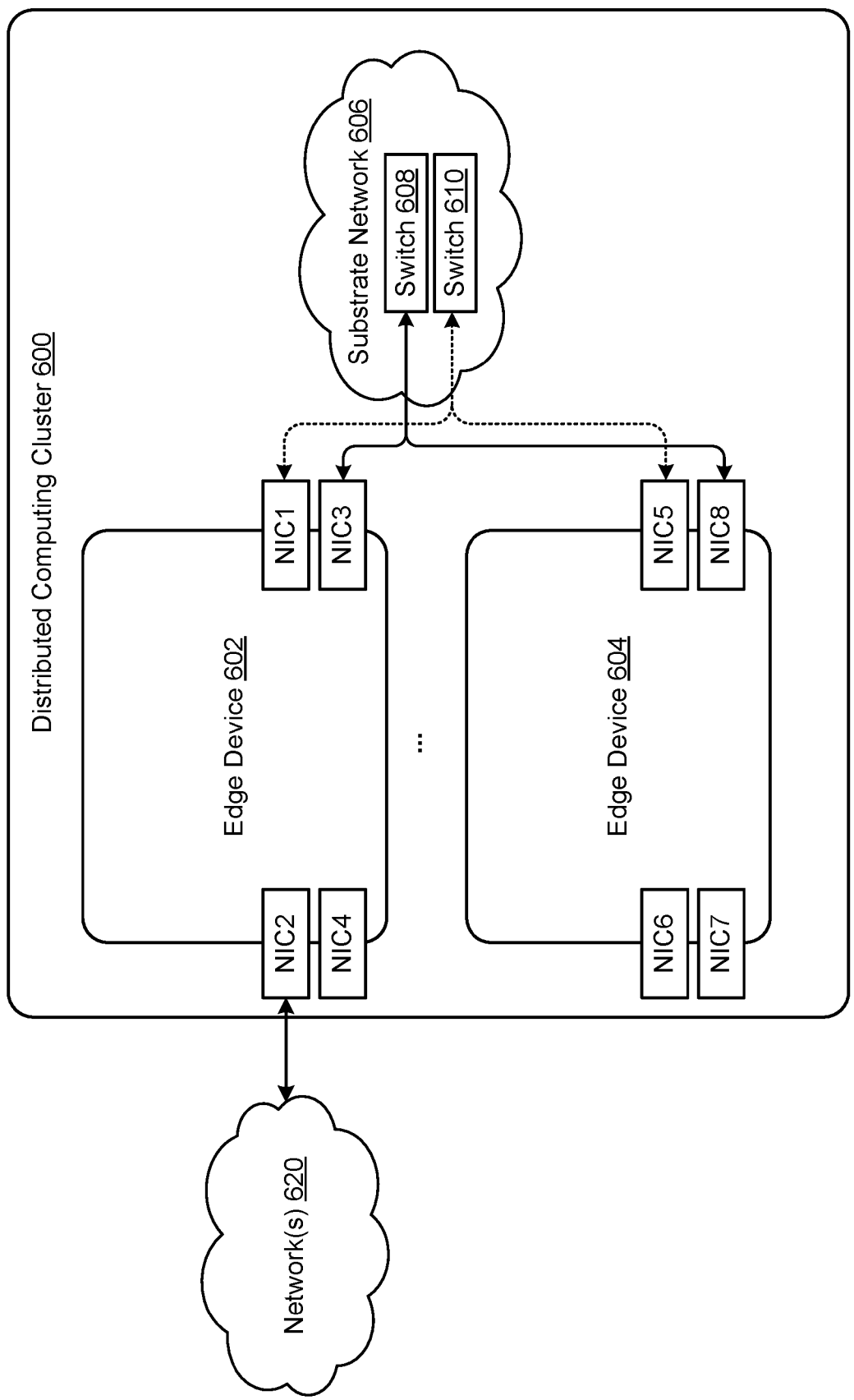
FIG. 6 is a block diagram depicting a distributed computing cluster that includes one or more edge computing devices, according to at least one embodiment.

FIG. 6 is a block diagram depicting a distributed computing cluster 600 that includes one or more edge computing devices (e.g., edge device 602 and 604, each an example of the edge device 500 of FIG. 5), according to at least one embodiment.

Each edge device of the distributed computing cluster 600 may be connected via substrate network 606 (an example of the substrate network 504 of FIG. 5. In some embodiments, the edge devices of the distributed computing cluster 600 (sometimes referred to as "edge computing nodes" or "edge nodes") may be connected by the substrate network 606 using one or more switches (e.g., switch 608 and/or 610). In some embodiments, NIC1 and NIC5 may include a particular connector (e.g., RJ45 connector) while NIC3 and NIC8 may include the same or a different connector (e.g., a QSFP28 100 GbE connector). In some embodiments, only one edge device of the distributed computing cluster 600 is connected to a customer network such as network(s) 620 (an example of the network 520 of FIG. 5). Thus, not only may traffic between services of an edge device be encrypted and isolated from other traffic of a given edge device, but traffic between distributed services operating across multiple edge devices may also be encrypted and isolated from other traffic of the computing cluster. In some embodiments, each edge device is preconfigured as a particular node in the distributed computing cluster 600. In other embodiments, the user can configured the number and topology of the edge devices of the distributed computing cluster 600.

Figure 7:
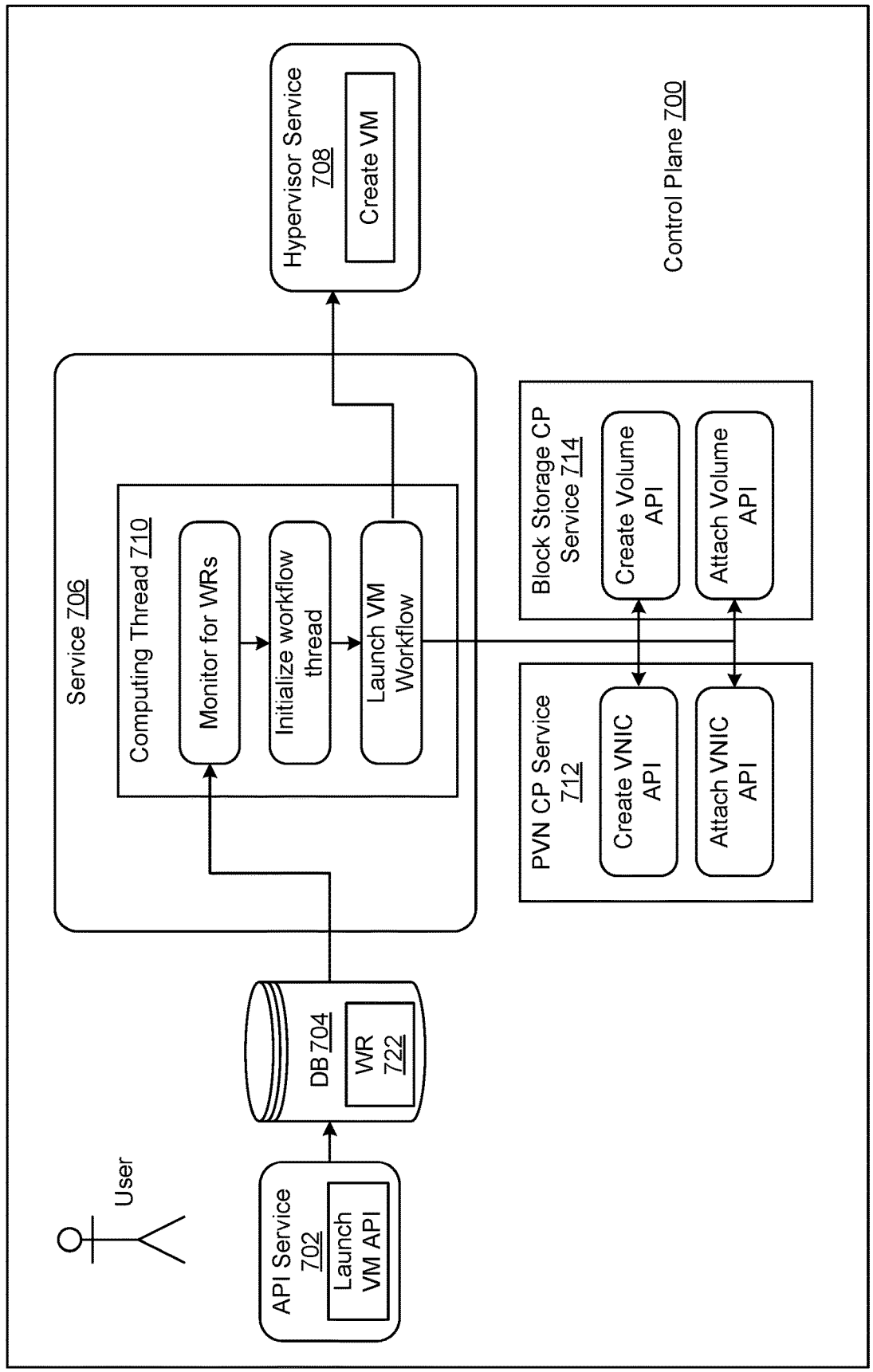
FIG. 7 is a block diagram depicting a control plane and flow for executing a workflow by one or more components of a cloud infrastructure edge computing device, according to at least one embodiment.

FIG. 7 is a block diagram depicting a flow 700 for executing a workflow by one or more components of a cloud infrastructure edge computing device, according to at least one embodiment. Components that execute the flow 700 may include API service 702, database (DB) 704, service 706, hypervisor service 708, PVN CP service, Block storage CP service 714, although more or fewer services may be included. In some embodiments, each of the services of FIG. 7 are an example of a service of the service(s) 502 of FIG. 5. In some embodiments, at least some of the functionality discussed in connection with the services of FIG. 7 may be combined in any suitable combination and provided as a single service or instances of the same service. By way of example, in some embodiments, the functionality of services 702-708 may be provided by a single service (e.g., compute CP service discussed above in connection with FIG. 5). In some embodiments, the functionality provided by the services 702-708 may be provided by a single edge device (e.g., edge device 500 of FIG. 5) or by two or more edge devices (e.g., by edge device 602 and edge device 604 of FIG. 6).

In some embodiments, the API service 702 may be configured to accept work requests that include intended state data that describes an intended state of a set of data plane resources (e.g., VM(s) 508 of FIG. 5). As a non-limiting example, user 720 may utilize a user device (e.g., the user device *202 of FIG. *2) to access a user interface with which he can make various selections indicating a desire to launch a VM. The user input may be received by the API service 702 (an example of the compute CP service of FIG. 5) which may generate a work request (WR) (e.g., WR 722) and utilize a predefined Launch VM API to store the work request in a distributed database (e.g., DB 704). In some embodiments, the DB 704 may be a computing cluster, which is configured to use etcd3 as an immediately consistent, highly-available, transactional, distributed database. Generally, a work request indicates a desire and information needed to create and/or modify data plane resources such as VM(s) 508. In some embodiments, the work request includes state information indicating a desired state for the data plane resource. In some embodiments, the DB 704 may be accessible to all services operating on any edge device (and by services operating on any suitable edge device of an edge device cluster such as distributed computing cluster 600).

Service 706 (e.g., an example of the compute CP service of FIG. 5) may be configured to execute one or more worker processes (e.g., one or more computing threads, such as computing thread 710). Some of these worker processes may be configured by the service 706 at any suitable time to execute a continuous and/or ongoing predefined workflow. By way of example, the service 706 may configure one or more worker threads (e.g., including computing thread 710) to monitor the DB 704 for new work requests (e.g., WR 722). The computing thread may be configured to determine if a work request WR 722 is already being attended to. In some embodiments, this entails checking a predefined storage bucket within DB 704 for a unique identifier associated with WR 722. If the unique ID included within WR 722 does not appear in the bucket (or the WR is otherwise indicated as having not been picked up for processing), the computing thread 710 (e.g., a nanny thread) may initialize a workflow thread (e.g., another instance of a computing thread 710) which may then be configured by the computing thread 710 to execute a workflow corresponding to launching a VM corresponding to the WR 722.

The initialized workflow thread may be communicatively coupled (e.g., via the substrate network 504 of FIG. 5) to a workflow service (not depicted). The workflow service may be configured to identify, from one or more predefined workflows, a predefined workflow that corresponds to launching a VM, and therefore, to the WR 722. These predefined workflows identify one or more steps/operations to be taken, and a sequence to those steps, in order to achieve a predefined goal (e.g., launching a virtual machine, stopping/starting a virtual machine, terminating a virtual machine, creating a block volume, removing a block volume, etc.). The workflow thread may launch the VM workflow and oversee its execution by various other entities. In some embodiments, the workflow thread may pass any suitable portion of the intended state data of the DP resource to any suitable combination of services.

As a non-limiting example, as part of the workflow for launching a virtual machine (e.g., a VM to be hosted by hypervisor service 708), one or more APIs can be called for creating and attaching the VNIC. Similarly, a number of APIs may be provided for creating and/or attaching a block storage volume API. In some embodiments, the workflow thread may perform any suitable call to one or more APIs to invoke the functionality of PVN CP Service 712, which in turn may be configured to create and attach a VNIC. The workflow thread may then call block storage CP service 714 which may then execute any suitable operations to create and attach a block storage volume. The worker thread overseeing the workflow may ensure a designated order (e.g., create the VNIC first before creating the block volume). This worker thread may be configured to catch any errors and/or exceptions from one or more services it has invoked. If no exceptions/errors are encountered, the worker thread overseeing the workflow can provide any suitable data to the hypervisor service 708 (via the substrate network), which in turn, execute functionality for creating the VM requested. The hypervisor service 708 may provide actual state data for the newly launched VM. In some embodiments, the worker thread overseeing the workflow can store the actual state data in the DB 704 for later reference (e.g., when a monitor may determine whether the actual state data matches the requested state data indicating no changes needed or when the actual state data fails to match the requested state data, indicating a change of the data plane resources is needed).

In some embodiments, the workflow thread may be communicatively coupled to a cluster manager (not depicted). Cluster manager may be configured to manage any suitable number of computing clusters. In some embodiments, the cluster manager may be configured to manage any suitable type of computing cluster (e.g., a Kubernetes cluster, a set of computing nodes used to execute containerized applications, etc.). The workflow thread may be configured to execute any suitable operations to cause the cluster manager to execute any suitable orchestration operation on the DP resource(s) (e.g., a VM) in accordance with the instructions identified to bring the DP resource(s) in line with the intended state data. In some embodiments, a monitoring entity (e.g., the workflow thread, a thread launched by the workflow thread) may be communicatively coupled to DP resource(s) 116 and configured to monitor the health of DP resource(s). In some embodiments, the monitoring entity may be configured to store any suitable health data in the DB 704.

The specific operations and services discussed in connection with FIG. 7 is illustrative in nature and is not intended to limit the scope of this disclosure. The particular operations performed, and services utilized may vary depending on the particular workflow associated with the requested operations.

Virtual Edge Devices

Techniques are provided (e.g., a method, a system, non-transitory computer-readable medium storing code or instructions executable by one or more processors) for managing and/or provisioning one or more virtual cloud-infrastructure edge devices (hereinafter referred to "virtual edge devices," for brevity) at a physical cloud-infrastructure edge computing device. The physical cloud-infrastructure edge computing device (hereinafter referred to as an "edge device," for brevity) may be a computing device configured to deliver computing and storage at remote locations separate from the centralized data center and lacking a public/private network connection. The edge device may be used at remote locations, separate from a centralized cloud computing environment.

In some embodiments, composing an edge device with one or more virtual edge devices may utilize a manifest that specifies the configuration for that device and each of the virtual edge devices. At times, it may be desirable to provision the edge device with, or otherwise allow access to, particular resources (e.g., objects, files, virtual machine images, etc.) that may be obtainable from a user's cloud-computing tenancy (e.g., from object storage, block storage, etc.). These resources may also be specified in and provisioned according to the manifest. As used herein, term "provision" is intended to include any suitable combination of provisioning, configuring, or deploying artifacts (e.g., software, containers, images, scripts, etc.) to a physical or virtual computing device (e.g., an edge device, a virtual edge device, etc.).

Conventional edge devices were restricted to executing resources associated with a single tenancy and/or compartment. However, users may desire to execute a variety of resources from a variety of their tenancies/compartments of the centralized cloud. Techniques described herein enable any suitable number of virtual edge devices to be provisioned and/or configured at the physical edge device. In some embodiments, these virtual edge devices can be associated with different tenancies/compartments, enabling the user to utilize the same physical edge device for different workloads corresponding to different tenancies and with potentially differing resources (e.g., services, volumes, virtual machines, blocks, etc.). Utilizing these techniques, a single physical edge device could be configured to execute a variety of operations corresponding to any suitable number of virtual edge devices, potentially concurrently. Various embodiments are described herein, including methods, systems, non-transitory computer-readable storage media storing programs, code, or instructions executable by one or more processors, and the like.

Figure 8:
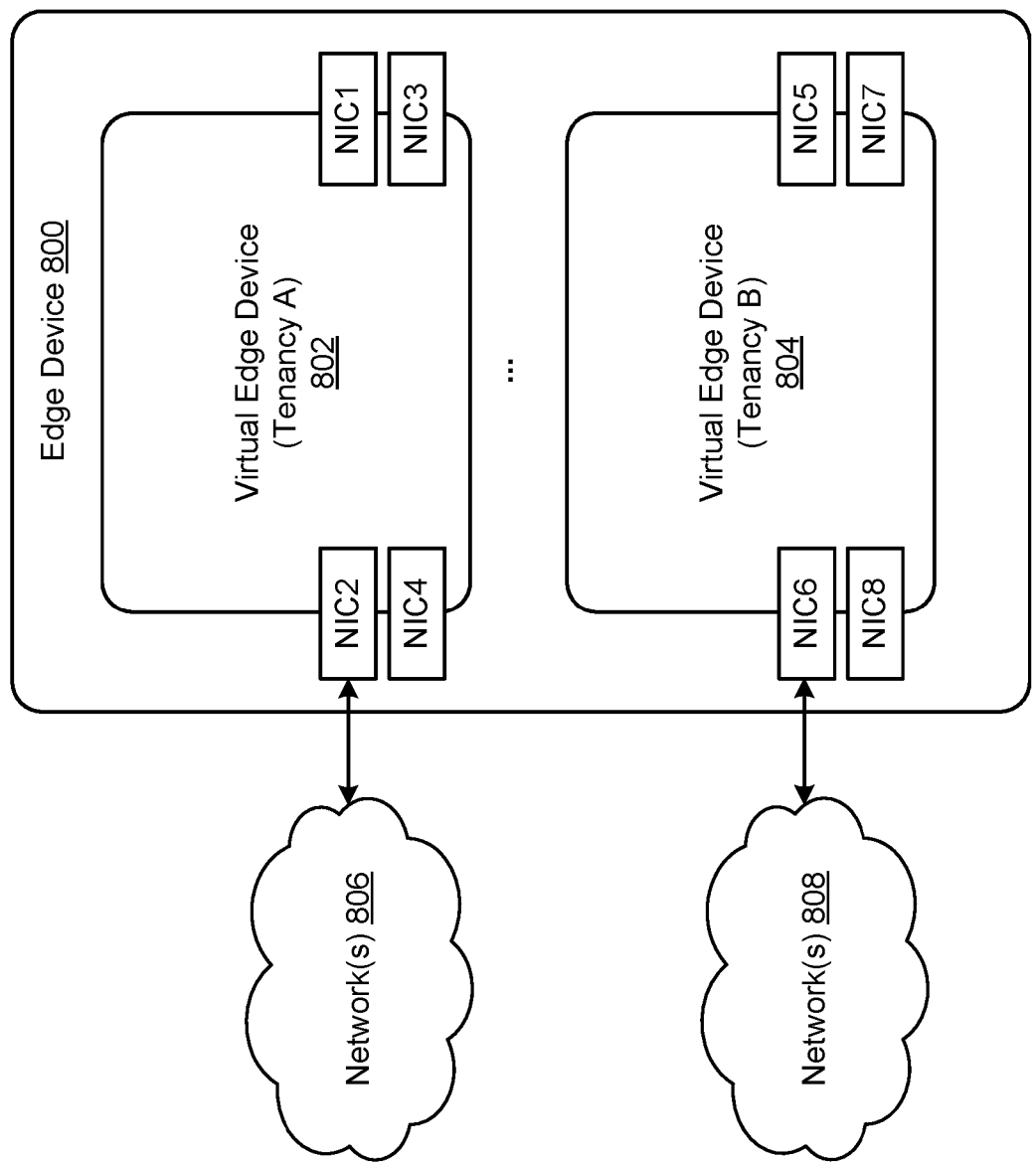
FIG. 8 is a block diagram depicting an edge device provisioned with multiple virtual edge devices, according to at least one embodiment.

FIG. 8 is a block diagram depicting an edge device 800 (e.g., a physical device) provisioned with multiple virtual edge devices, according to at least one embodiment. Edge device is intended to be an example of the edge device 500 of FIG. 5. As depicted, edge device 800 is configured with at least two virtual edge devices (e.g., virtual edge device 802 and virtual edge device 804). In some embodiments, the virtual edge devices may be associated with different compartments and/or tenancies (e.g., root compartments) of a centralized cloud-computing environment (e.g., Oracle cloud). By way of example, and as depicted, virtual edge device 802 and virtual edge device 804 may be associated with "Tenancy A" and "Tenancy B," respectively.

Each of the virtual edge devices of the edge device 800 may individually include any suitable combination of the various components discussed above in connection with the edge device 500 of FIG. 5. That is, each virtual edge device may include a substrate network (e.g., substrate network 504), service(s) (e.g., service(s) 502), virtual NIC(s) (e.g., virtual NIC(s) 506), virtual machines (e.g., virtual machine(s) 508), private virtual networks (e.g., private virtual network(s) 505, operating system(s) (e.g., operating system 530), and the like.

Each virtual edge device may include any suitable number of resources (e.g., services, volumes, virtual machines, images, etc.). At least some resources may execute as a container (e.g., a Docker container) locally on the virtual edge device. Any suitable number of service(s) executing at the virtual edge device may be communicatively connected via a substrate network such that the communications between services are encrypted (e.g., in accordance with a security protocol such as MACsec). Each container may be assigned a substrate IP address (e.g., a static address) with which traffic can be addressed. In some embodiments, a security protocol (e.g., MACsec) is configured at provisioning time (e.g., before the edge device 800 is shipped to the user). The virtual edge device's system software may execute in the secure environments protected by boot security software (e.g., Trenchboot Secure Launch). Users may be restricted from accessing the secure environment and/or the substrate network of a virtual edge device. To minimize the resources used by these services, the service code may be compiled and saved to disk to decrease RAM space as well as decrease the CPU load on the edge device 800. Example services are discussed in more detail above in connection with FIG. 5.

In some embodiments, virtual edge devices associated with different tenancies or compartments may be restricted from communicating with one another. For example, services the virtual edge device 802 may communicate via a substrate network that is inaccessible to the services executing at virtual edge device 804, and vice versa.

As with the edge device 500, each virtual edge device implements various networking functionality via a number of services such as a network address translation (NAT) service, a dynamic host configuration protocol (DHCP) service, a domain name system (DNS) service, a network time protocol (NTP) service, a metadata service, and a public API service). The metadata service may provide initialization data and other metadata to all VM(s) executing at the virtual edge device. Any suitable networking operations discussed above in connection with FIG. 5 and edge device 500 may likewise be provided by each of the virtual edge devices of edge device 800, including virtual edge device 802 and/or virtual edge device 804.

In some embodiments, any suitable number of virtual machines (not depicted) operating at virtual edge devices 802 and 804 may implement block (or object) storage. Some of the functionality provided by the virtual edge devices is similar to the functionality provided by a single edge device and discussed above in connection with FIG. 7. In general, although each service may not be discussed in detail herein, the general functionality provided by each of the virtual edge devices may include the functionality of cloud services provided by a remote cloud service provider. In some embodiments, each of the virtual edge devices of the edge device 800 may be associated with a predefined region and/or realm such that at least some of the respective service(s) of the virtual edge devices may operate as if they were operating in a cloud computing environment, despite the fact they are operating on one or more local device(s) (one or more edge devices) as a single instance or as part of a distributed service that may have no or intermittent public network access to a cloud computing environment associated with the customer. A "region" refers to a geographic location at which a service center resides. A "realm" refers to a logical collection of regions. Realms may be isolated from each other and do not share data.

In some embodiments, each of the virtual edge devices may provide any suitable number of virtual networks using compute, memory, and networking resources (e.g., virtual network interface card(s) (e.g., VNIC(s) 506)). Using the service(s) provided a given virtual edge device, one or more customer resources or workloads, such as virtual machines, can be deployed on these private virtual networks. Any suitable combination of VM(s) can execute functionality (e.g., a compute instance, storage, etc.) which is individually accessible through a virtual NIC. Each VM that is part of a private virtual network (PVN) may be associated with a VNIC that enables the VM (e.g., a compute instance) to become a member of a subnet of the PVN. The VNIC associated with a VM facilitates the communication of packets or frames to and from the VM. A VNIC can be associated with a VM when the VM is created. PVN(s) 505 can take on many forms, including peer-to-peer networks, IP networks, and others. In some embodiments, substrate network traffic of the service(s) of a virtual edge device may be encrypted and/or isolated (e.g., by virtue of different PVNs or subnets) from network traffic of one or more other VMs executing at the virtual edge device.

Each virtual edge device of the edge device 800 thus provides infrastructure and a set of complementary services that enable customers to build and run a wide range of applications (e.g., compute instances), services, and/or storage in a highly available, physically local, and virtual hosted environment. By provisioning the edge device 800 with multiple virtual edge devices, the customer may configure a single physical device (e.g., the edge device 800) to be capable of executing potentially drastically different tasks, workloads, and operations, with potentially drastically different resources. In some embodiments, these virtual edge devices could execute concurrently, providing even more extensive computing resources than originally provided by a single edge device. This extends the versatility edge devices in general, reduces costs in overhead and manufacture, and enhances the user's experience.

Each of the virtual edge devices 802 and 804 may be communicatively connected to a user device (e.g., the computing device 202 of FIG. 2) via one or more network interfaces (e.g., NIC2 and/or NIC 6) and via networks 806 and/or 808, respectively, to interact and/or manage the resources and operations of each virtual edge device. In certain embodiments, a lightweight console can be provided at the user device via a web-based user interface that can be used to access and manage the edge device 800, including accessing and/or managing the virtual edge devices providing by the edge device 800. In some implementations, the console is a web-based application provided by a service of one or more of the virtual edge devices.

FIG. 8 depicts a single edge device (e.g., edge device 800). However, it should be appreciated that more than one edge device may be utilized as a distributed computing cluster. In general, any suitable operations, functionality, and/or resources provided by the edge devices of FIGS. 5 and 6, may be likewise provided by any virtual edge device.

Figure 9:
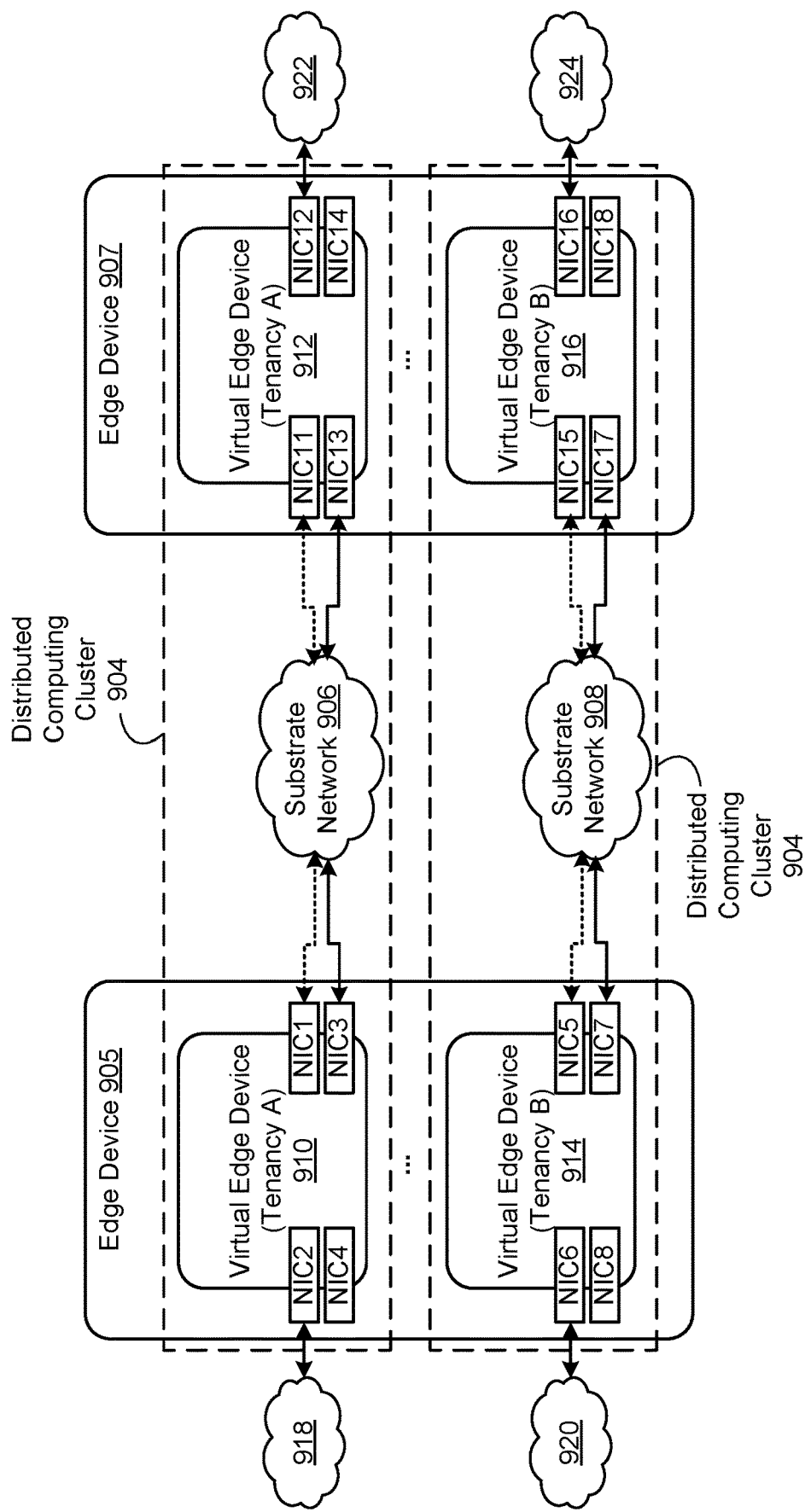
FIG. 9 is a block diagram depicting multiple distributed computing clusters that utilize virtual edge devices, according to at least one embodiment.

FIG. 9 is a block diagram depicting an environment 900 including multiple distributed computing clusters (e.g., cluster 902 and cluster 904) that utilize virtual edge devices (e.g., virtual edge devices 910-916), according to at least one embodiment. In some embodiments, the clusters 902 and/or 904 may utilize virtual edge devices from any suitable number of physical edge devices (e.g., edge device 905 and edge device 907).

Each virtual edge device of the distributed computing clusters 902 and 904 may be connected via corresponding substrate network (e.g., substrate network 906 and substrate network 908, respectively, each being an example of the substrate network 504 of FIG. 5). In some embodiments, the virtual edge devices of the distributed computing cluster 902 (e.g., virtual edge device 910 and virtual edge device 912) may be connected by the substrate network 906 using one or more switches (not depicted). In some embodiments, NIC1, NIC11, NIC5, and NIC15 may include a particular connector (e.g., RJ45 connector) while NIC3, NIC 13, NIC 8, and NIC18 may include the same or a different connector (e.g., a QSFP28 100 GbE connector). In some embodiments, only one virtual edge device of each the clusters 902 and 904 is connected to a customer network such as network(s) 920-924 (each an example of the network 520 of FIG. 5). In some embodiments, the network(s) 920-924 may differ or may be the same network. Not only may network traffic between services of a virtual edge device be encrypted and isolated from other traffic of a given virtual edge device, but traffic between distributed services operating across multiple virtual edge devices (e.g., on the same or different physical edge devices) may also be encrypted and isolated from other traffic of the computing cluster. In some embodiments, each virtual edge device is preconfigured as a particular node of its respective cluster. In other embodiments, the user can configure the number and topology of the virtual edge devices of the clusters 902 and/or 904.

In some embodiments, the virtual edge devices of one cluster (e.g., cluster 902) may be associated with a tenancy and/or compartment (e.g., "Tenancy A") that may be the same or differ from a tenancy and/or compartment (e.g., "Tenancy B") associated with the virtual edge devices of another cluster (e.g., cluster 904). Although FIG. 9 depicts each cluster as including only one virtual edge device of a given edge device, any suitable number of virtual edge devices of a single physical edge device (e.g., edge device 905) may be included in a distributed computing cluster.

Figure 10:
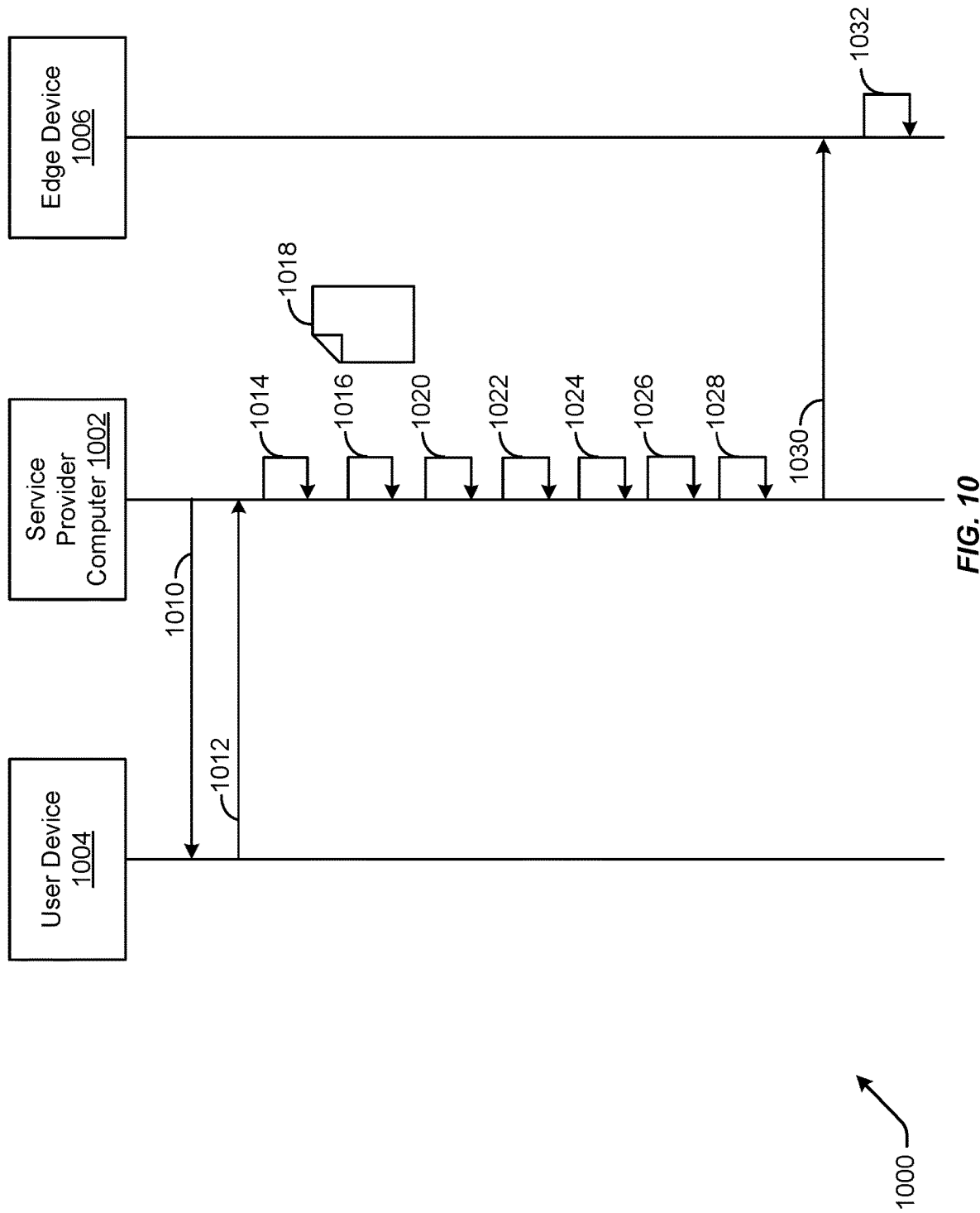
FIG. 10 is a block diagram depicting a flow for generating a manifest from a user request, according to at least one embodiment.

FIG. 10 is a block diagram depicting a flow 1000 for generating a manifest from a user request, according to at least one embodiment. FIG. 10 depicts a service provider computer (e.g., service provider computer 1002). Service provider computer 1002 (e.g., including one or more computing devices) can be operated by or on behalf of a cloud-computing provider. In some embodiments, the service provider computers 1002 of FIG. 10 implement a cloud-computing service for generating a manifest from which one or more edge devices (e.g., edge device 1006) can be configured. Edge device 1006 is intended to be an example of any of the edge devices described in the above figures. In some embodiments, the edge device 1006 may be configured, using the manifest, to execute one or more virtual edge devices (e.g., virtual edge devices 910 and 914 of FIG. 9, not depicted here). The service provider computers 1002 of FIG. 10 may be communicatively connected to or operate as part of a cloud-computing environment operated by the cloud-computing provider. The user device 1004 may be any suitable electronic device (e.g., a laptop, desktop, smartphone, or the like) and communicatively connected to the service provider computer 1002 via a network (e.g., a public or private network). Service provider computer 1002 may be configured to host one or more interfaces from which user input may be provided. These user interfaces may relate to configured one or more edge devices.

The flow 1000 may begin at 1010, where the service provider computer 1002 exposes one or more user interfaces from which user input may be obtained. The exposed interfaces may be used to define a configuration via configuration data (e.g., node identifier (ID), node name, device attributes, cluster name, virtual node identifier(s), network interface card information, driver information, image name, image storage location within a centralized cloud-computing environment, network name, network addresses, virtual machine information corresponding to one or more virtual machines, or any suitable attribute of the edge device 1006, including any suitable attribute of any suitable number of virtual edge devices). In some embodiments, these user interfaces enable a user to select various resources (e.g., objects, files (e.g., data files, configuration files, etc.), images (e.g., virtual machine images, service images, etc.), etc.) to be configured at one or more edge devices (of which edge device 1006 is an example). These data plane resources may also be referred to herein as "workloads." In some embodiments, the user may define a cluster of physical edge devices and their corresponding configurations. Each physical edge device may be provisioned and/or configured to execute any suitable number of virtual edge devices.

Using the provided interfaces, the user can indicate the edge device 1006 is to be compute intensive (e.g., where a majority of virtual machines executing at one virtual edge device of the edge devices 1006 are providing computing resources), storage intensive (e.g., where a majority of virtual machines executing at another virtual edge devices of the edge device 1006 are providing storage resources), GPU intensive (e.g., where a majority of virtual machines executing at yet another virtual edge devices of the edge device 1006 are providing GPU resources), or the like (e.g., based at least in part on a number of virtual machines requested and the specific configuration of these virtual machines as selected by the user). The user interfaces may be in any suitable format that allows the user to select and/or define these attributes of one or more edge devices (e.g., the edge device 1006), each including any suitable number (e.g., 0, 1, 10, etc.) of virtual edge devices.

At 1012, the user device 1004 may submit the user input in a user request that is received by the service provider computer 1002. The service provider computer 1002 may be hosting, within a centralized cloud-computing environment, a build service and/or a service specific to edge devices. In some embodiments, any suitable number of user requests may be transmitted to the service provider computer 1002 as the user incrementally specifies various aspects of one or more edge device configurations.

At 1014, the service provider computer 1002 may execute any suitable operations for validating the user's request. By way of example, when the user request includes data corresponding to a resource to be provisioned to the edge device(s) (e.g., to the edge device 1006, to a virtual edge device of the edge device 1006, etc.), the service provider computer 1002 may execute any suitable operations for verifying that one or more corresponding access control polices exist that enable the edge device to access storage locations corresponding to those resources. In some embodiments, if one or more resources identified in the request are inaccessible to the edge device 1006, the service provider computer 1002 may be configured to deny the request. In these scenarios, the service provider computer 1002 may provide any suitable information to the user device 1004 to indicate the denial and/or a reason for which the request was denied (e.g., the access control policy enabling access by the edge device 1006 (or a particular virtual edge device of the edge device 1006) to the specified resource is missing). In some embodiments, the service provider computer 1002 may cease operations after determining that one or more resources are inaccessible to the edge device 1006 and/or after transmitting information to the user device 1004 regarding the denial. Alternatively, if the service provider computer 1002 determines that the resources identified in the request are accessible to the edge device 1006, the flow may proceed to 1016. An example of operations performed by the service provider computer 1002 to validate the user's request are described in greater detail in connection to FIGS. 13 and 14.

At 1016, the service provider computer 1002 may generate a manifest 1018 (e.g., a record, a file, etc.) corresponding to the user request. The manifest 1018, once complete, may be utilized to configure the edge device 1006 according to the user request. In some embodiments, the service provider computer 1002 may generate manifest 1018 based at least in part on a predefined template. In some embodiments, manifest 1018 may be in any suitable format (e.g., JSON, XML, etc.). Initially, the manifest 1018 may be at least partially incomplete. Once generated, the service provider computer 1002 may modify the manifest 1018 to correspond to the user request. By way of example, the manifest 1018 may be modified to include configuration data for one or more edge devices as provided in the user input received at 1012.

Figure 11:
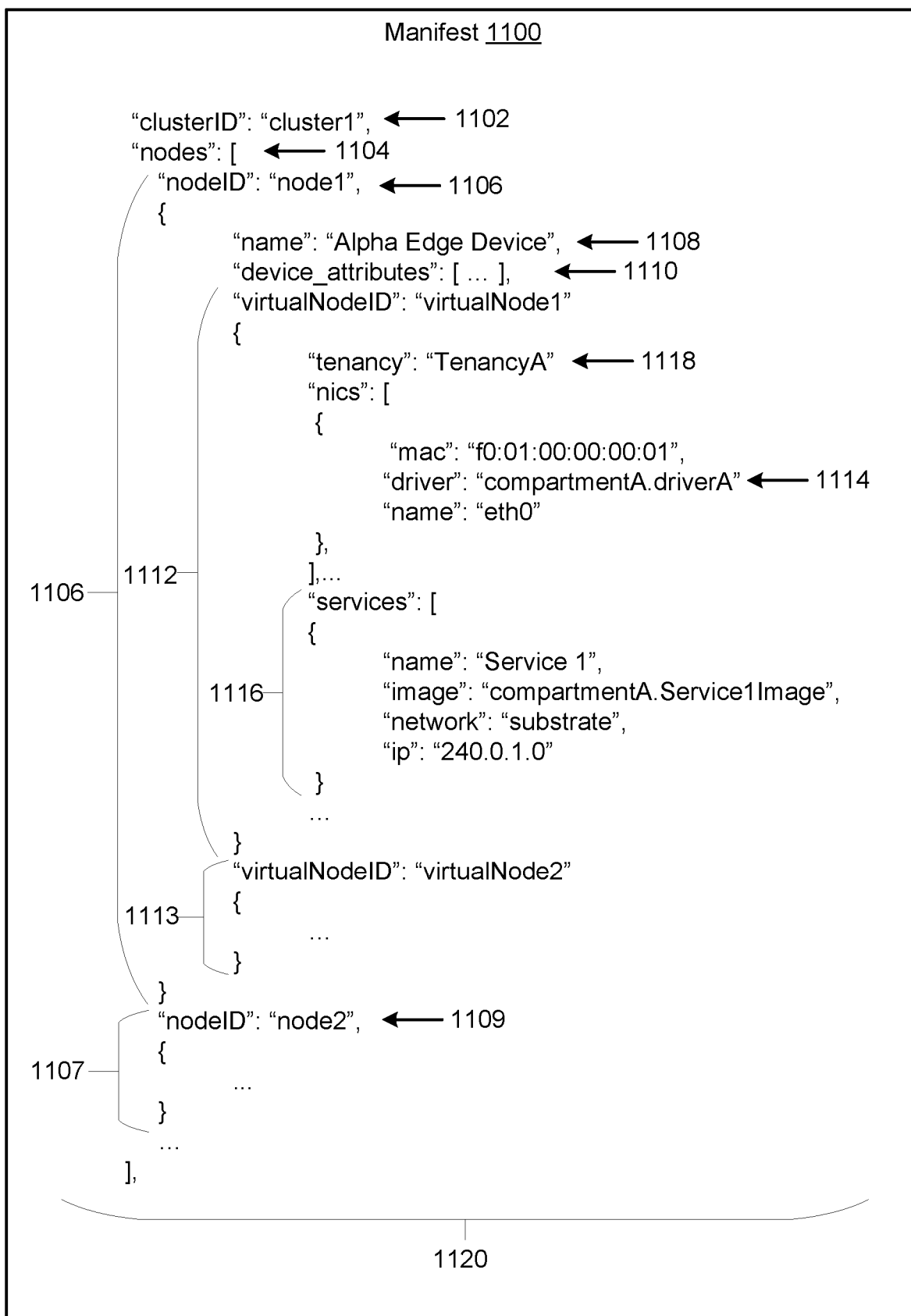
FIG. 11 is a block diagram depicting an example manifest, in accordance with at least one embodiment.

FIG. 11 is a block diagram depicting an example manifest 1100 (an example of the manifest 1018 of FIG. 10), in accordance with at least one embodiment. The manifest 1100 may include any suitable number of attributes corresponding to a group of one or more edge devices (each including any suitable number of virtual edge devices (e.g., 0, 2, 5, etc.). By way of example, a cluster identifier (e.g., attribute 1102) is depicted in FIG. 1. Each distributed computing cluster of the manifest 1100 may correspond a respective portion of the manifest 1100 that is depicted in FIG. 11. Multiple clusters may be defined, each having a cluster identifier (e.g., cluster identifier 1102) that unique identifies the cluster. Each cluster may include any suitable number of node definitions. A "node" or "physical node," as used herein, refers to a physical edge device (e.g., the edge device 905 of FIG. 9). These nodes and their corresponding attributes may be defined using any suitable format, for example a list, as depicted at 1104. Node section 1106 is intended to depict configuration data corresponding to one physical edge device. Node section 1107 is intended to depict configuration data corresponding to one physical edge device. In some embodiments, a node may be assigned an identifier and/or a name as depicted at 1106 and 1108, respectively for the first node, and as depicted at 1109 for the second node. The manifest 1100 may indicate a set of device attributes for each node (e.g., a particular physical edge device) at 1110.

Node section 1106 may include any suitable attribute corresponding to a physical node including, but not limited to, any suitable number of virtual node definitions. A "virtual node" is intended to refer to a virtual edge device. Virtual node section 1112 is intended to depict an example of a single virtual node definition. Similarly, virtual node section 1113 is intended to depict an example section corresponding to a different virtual node of the same physical node. Any suitable attribute of a specific virtual node may be provided in virtual node sections 1112 and 1113, respectively, and any suitable number of instances of virtual node sections may be defined within section 1106, each corresponding to a respective virtual node of a given physical node.

A manifest may include any suitable information pertaining to one or more network interface cards. A network interface card may be defined as having a media access control (MAC) address or another suitable identifier such as a name. Each network interface card may correspond to a node or virtual node. In some embodiments the manifest 1100 may identify (e.g., using attribute 1114 or the like) a location from which a resource (e.g., a driver) for a network interface card may be obtained. Node section 1106 may include any suitable number of NIC definitions corresponding to any suitable physical or virtual node. In some embodiments, attribute 1114 may identify a compartment (or other suitable container), a file name (e.g., "driverA"), a tenancy, or any suitable information with which a storage location and/or identity of a resource (e.g., an object, an object bucket, a container, a storage location, a file, an image, etc.) may be obtained.

A manifest may identify any suitable number of resources (e.g., services, images, documents, drivers, buckets, files, etc.) and/or locations from which said resources may be obtained (e.g., locations within the user's centralized cloud-computing environment, for example, locations within one or more of the user's centralized cloud tenancies or compartments). Manifest 1100 depicts an example service definition at 1116. Within the service definition, various service level attributes may be identified. By way of example, section 1116 may include a name for the service, a location at which the image for the service can be found and/or a file name or file path for the image, a default network name (e.g., a name for the substrate network 504 of FIG. 5) within which the service will operate, an indicator indicating whether the service will start on boot, and an IP address for the service, and the like. The manifest 1100 may include any suitable number of service and/or resource definitions within any suitable combination of one or more nodes and/or virtual nodes.

In some embodiments, a node and/or a virtual node may be associated with a particular compartment and/or tenancy. By way of example, attribute 1118 identifies a compartment (e.g., "TenancyA," a tenancy, which is an example of a compartment) associated with a virtual node corresponding to virtual node section 1112. Likewise, any resource definition such the service definition depicted by section 1116 can identify a compartment/tenancy, a file name (e.g., "Service1Image"), or any suitable information with which a storage location and/or identity of a resource (e.g., a node, a virtual node, an object, an object bucket, a container, a storage location, a file, a driver, a script, code, an image, etc.) may be ascertained. Each of the sections 1106, 1107, 1112, 1113, 1116, and 1120 may be considered a resource definition corresponding to particular resource such as: a first node, a second node, a first virtual node of the first node, a second virtual node of the first node, a service of the first virtual node, and a distributed computing cluster (or potentially many clusters), respectively.

Although the manifest 1100 is depicted as including certain attributes of a cluster, a node, a virtual node, or a device, it should be appreciated that a manifest may identify any suitable attributes of the same. Thus, the example attributes depicted in FIG. 11 are not intended to be considered an exhaustive list of the possible attributes that may be included in any given manifest.

Returning to FIG. 10, at 1020, the service provider computer 1002 may generate a list of resources (e.g., objects, files, images, scripts, etc.) based at least in part on the user input and execute any suitable operations collecting at least some of this data. By way of example, in some embodiments, the service provider computer 1002 may collect one or more executable scripts associated with one or more portions of configuration data (e.g., a node, a virtual node, a service, a resource, etc.). In some embodiments, the specified storage locations may indicate particular compartments of a given tenancy of a centralized cloud-computing environment. In some embodiments, some of these resources may include containers of each of the set of services requested for a given edge device or virtual edge device.

At 1022, the manifest 1018 may be modified to indicate configuration data (e.g., attributes/details) in accordance with the user input received at 1012. By way of example, any suitable executable script collected at 1020 may include an executable script that, when executed modifies a manifest file to include entries corresponding any suitable portion of the configuration data for one or more edge devices. The service provider computer 1002 may be configured to execute each script. Each script may be configured to modify the manifest file to include a particular portion of configuration data (e.g., a resource definition corresponding to a single service, a resource definition corresponding to a network interface card, etc.). Each script may modify the manifest to include any suitable entity definition, where the entity definition defines attributes of a device, service, resource, node, virtual node, etc. In some embodiments, a script may utilize any suitable portion of the received user input to modify the manifest 1018. For example, a storage location specified in the user request may be utilized by a corresponding script to specify a value for a particular attribute (e.g., a storage location of a driver of a NIC card, a storage location of a virtual machine image, etc.).

At 1024, the service provider computer 1002 may execute a predefined rule set for assigning one or more network addresses to any suitable number of devices/entities/services identified within the manifest 1018. By way of example, an IP address may be assigned to each node of the cluster (e.g., each edge device that will operate as a node in a cluster of edge devices).

In some embodiments, at 1026, the service provider computer 1002 may generate an Edge Device (ED) Image based at least in part on the artifacts collected at 1018. In some embodiments, an ED Image may be an uber-tarball that contains the entirety of the Container and OStree on-box repositories for a given edge device.

At 1028, the service provider computer 1002 may be configured to collect any suitable predefined configuration files, credentials (e.g., an API key, a data volume password, a Macsec key or other suitable encryption key, etc.) agents (e.g., a netboot agent), or the like. In some embodiments, at least some of these resources may be otherwise obtained by the edge device 1006.

At 1030, the service provider computer 1002 (or another suitable system and/or computing device) may provision the edge device 1006 (when available) by providing any suitable portion of the ED Image, manifest, configuration files, credentials, and agents to edge device 806. It should be appreciated that, in some embodiments, another service provider computer other than the one that created the manifest (e.g., a service provider computer located at a provisioning center) could execute the provisioning operations. In some embodiments, At 1032, the edge device 1006 may perform any suitable operations for provisioning the edge device 1006 in accordance with the manifest 1018. By way of example, a netboot agent executing on the edge device 1006 may perform, among other things, any suitable operations related to the following: booting, partitioning, setup dmcrypt, formatting the file system. requesting an artifact URL (e.g., from the service provider computer 1002), obtaining artifacts using the URL, obtaining resources using the storage locations identified in the manifest 818, committing the root file system to OStree repository, loading containers into a container repository, deploying an OStree commit, fetching remote keys and generating and/or installing local keys, installing Trenchboot and sealing an OS partition LUKS key (e.g., in a trusted platform module such as a chip, a hardware security module, an integrated circuit platform, or other hardware, firmware, and/or software for providing secure initialization of the edge device and security management of stored secrets, including encryption key(s)), and the like.

After the edge device(s) (of which edge device 1006 is an example) are provisioned/configured according to the manifest 1018, the cloud-computing provider may ship or otherwise deliver the edge device(s) to the customer. The edge devices now being configured in accordance with the user input provided at 1012.

Figure 12:
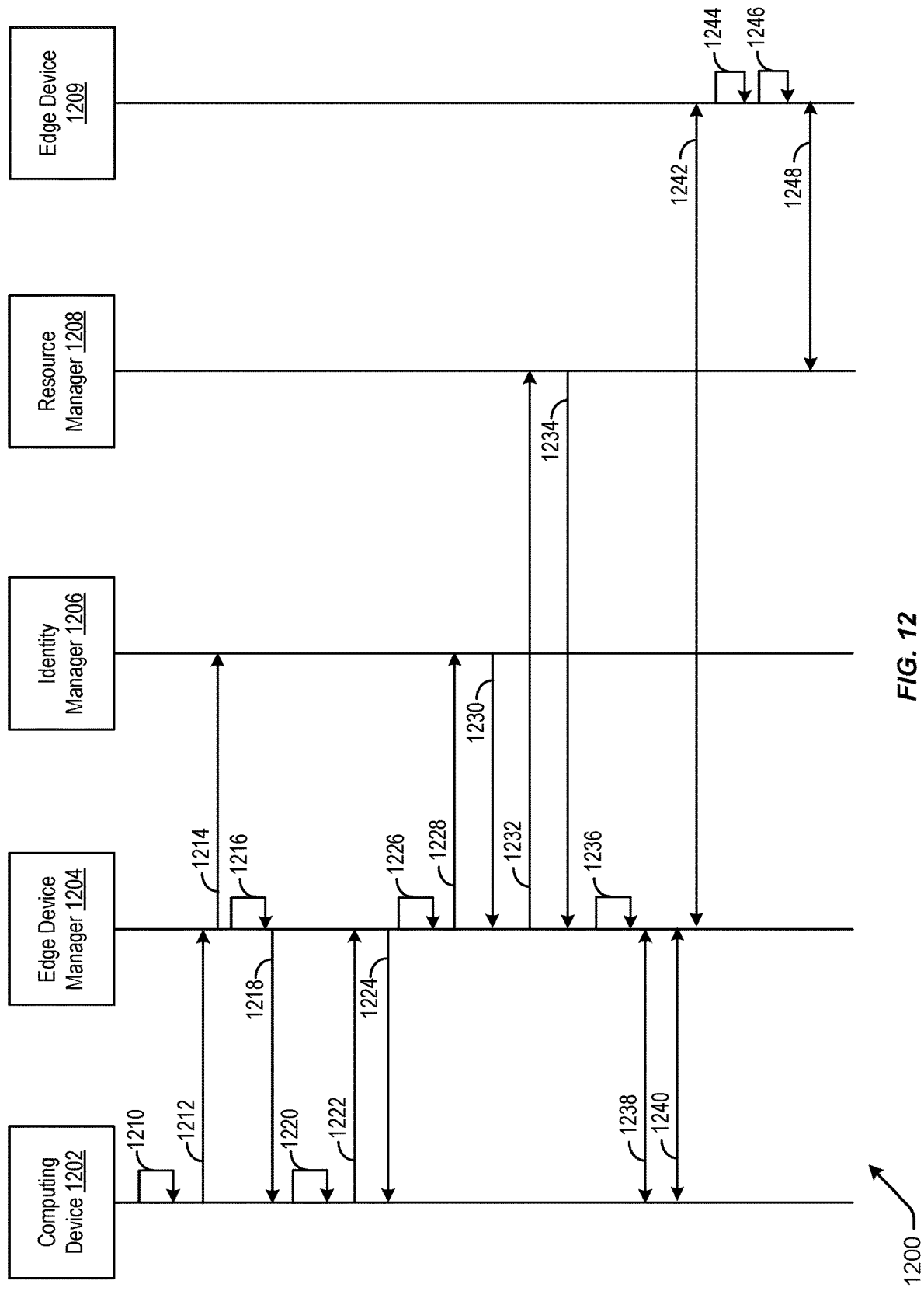
FIG. 12 is a block diagram illustrating an example method for provisioning an edge device with one or more virtual edge devices, according to at least one embodiment.

FIG. 12 is a block diagram illustrating an example method 1200 for provisioning an edge device with one or more virtual edge devices, according to at least one embodiment. Method 1200 may be performed with a computing device (e.g., computing device 1202, an example of user device 202 of FIG. 2) and an edge device manager 1204 (e.g., a computing component operating at the service provider computer 1002 of FIG. 10), an identity manager 1206, and a resource manager 1208. The edge device manager 1204 may be a computing module, service, system, or device, configured to manage the provisioning of one or more edge devices, virtual edge devices, and/or the generation of one or more manifests for provisioning one or more physical and/or virtual edge devices. The identity manager 1206 may be a computing module, service, system, or device, configured to validate the identity of users and/or devices (e.g., one or more edge devices) based at least in part on one or more credentials. In some embodiments, the identity manager 1206 may store and/or manage one or more access control policies related to various users and/or groups (e.g., user groups, device groups, etc.) to one or more resources (e.g., compartments, buckets, files, objects, images, etc.). The resource manager 1208 may be a computing module, service, system, or device, configured to manage one or more resources or the resource manager 1208 may be the resource itself (e.g., an object, object storage bucket, file location, file, image, etc.). In some embodiments, at least one of: the edge device manager 1204, identity manager 1206, and/or resource manager 1208, is a service operating in the centralized cloud-computing environment.

Method 1200 may begin at 1210, where edge device order information (e.g., node information, virtual node information, shipping information, payment information, credential information) may be entered at the computing device via one or more user interfaces. In some embodiments, any suitable attribute of manifest 1100 may be specified via the user interfaces. The user interfaces may be hosted or otherwise exposed by the edge device manager 1204 or another computing component (not depicted).

At 1212, a request including the edge device order information for one or more edge devices and, in some cases, one or more virtual edge devices, may be transmitted in a device request to edge device manager 1204 via one or more messages over a network (e.g., a private network or a public network such as the Internet). In some embodiments, a tenancy identifier that identifies a tenancy associated with the user, a physical edge device, and/or a virtual edge device, may be obtained and provided as part of the data transmitted at 1212 or tenancy/compartment data corresponding to the physical/virtual edge devices may be transmitted in a separate message. In some embodiments, the user may specify one or more computing clusters including any suitable combination of the physical edge devices and/or virtual edge devices.

In some embodiments, the device request could include edge device order information for one or more physical edge devices. The device request may include any suitable number of virtual edge devices corresponding to any of the respective physical edge devices. In some embodiments, the edge device manager 1204 may be configured to generate a unique identifier each cluster, physical edge device, virtual edge device, and/or any suitable resource provided in the device request. In some embodiments, the edge device manager 1204 may generate the identifier(s) according to a predefined scheme and/or using any suitable portion of data provided in the user request (e.g., a name of the physical/virtual node/edge device as designated in the user input provided in the device request).

At 1214, the edge device manager 1204 may validate (e.g., with identity manager 1206) any compartment/tenancies identified in the request received at 1212.

At 1216, in some embodiments, the edge device manager 1204 may register, enroll, or store the generated identifiers based at least in part on providing the identity manager 1206. In some embodiments, the identifiers may be deleted or the generation of the identifiers may be determined to fail if the identity manager 1206 does not accept the registration, enrollment, or storage of the identifier as requested by the edge device manager 1204. In some embodiments, the edge device manager 1204 requests generation of the various identifiers discussed above from the identity manager 1206 and the identity manager 1206 is configured to generate the identifiers for the resource(s) (e.g., physical/virtual edge devices, maintain a record of that identifiers, and provide the identifiers to the edge device manager 1206. As part of the operations performed at 1215, At 1218, the edge device manager 1204 may transmit a response to the device request to the computing device 1202. The response may include any suitable data indicating the request has been received. In some embodiments, the response may include the generated identifiers and/or a status indicating the success or failure of generating the identifiers. If the edge device manager 1204 was unable to generate (or register/enroll/store the identifiers), the response may indicate that the request has failed. Based at least in part on the response data, a user interface provided by the edge device manager 1204 and presented at the computing device 1202 may be updated to indicate a status of the device request. By way of example, the status (also referred to as "details") may indicate the order has been accepted, that the order is pending approval, that the order is in progress, that device provisioning has commenced, that device provisioning has concluded, that shipment is pending or occurred, or the like.

At 1220, any suitable number of resource attributes may be provided via a user interface. The resource attributes may be provided in response to a user selection at another user interface hosted by the edge device manager 1204. In some embodiments, the resource attributes specify any suitable attribute of any suitable resource (e.g., a service, an image, a file, a volume, an object, etc.) to be provisioned to the physical and/or virtual edge device (e.g., edge device 1209).

These resource attributes may be transmitted at 1222 in a request (referred to herein as a "resource request") to the edge device manager 1204. The request may include any suitable data. For example, the request may include the identifier provided for the edge device at 1214, a tenancy identifier corresponding to a tenancy associated with the user, a compartment identifier corresponding to a compartment in which the resource is located, and the like.

At 1224, in response to receiving resource attributes via the request transmitted at 1218, the edge device manager 1204 may transmit any suitable information for updating a status at the user interface from which the resource request was initiated. By way of example, the data transmitted at 1218 may update the status presented at the user interface indicating that validation is commencing, the request is in progress, etc. As a non-limiting example, the status may indicate the request is "In progress."

At 1226, the edge device manager 1204 may be configured to generate a credential for the requested edge device. If multiple edge devices were indicated in the request received at 1218 (indicating the resource is to be provisioned at multiple edge devices and/or virtual edge devices), the edge device manager 1204 may be configured to generate a credential for each physical/virtual edge device. In some embodiments, the credential is ephemeral. That is, the edge device manager 1204 may generate the credential to validate access to the requested resource(s) on behalf of the specified physical/virtual edge device(s). The edge device manager 1204 may store the credential as being associated with any suitable portion of the information transmitted at 1222 (e.g., the edge device's unique identifier, a compartment identifier, a tenancy identifier, etc.). After the resource is determined to be accessible/inaccessible to the edge device(s)), the edge device manager 1204 may delete the credential(s) at any suitable time. In some embodiments, the credential may include a public/private key pair (e.g., an RSA key pair). The public/private key pair may be used to generate digital signatures and verify those signatures. In some embodiments, requests from an edge device (or another computing component such as the edge device manager 1204 when sending a request on behalf of a physical/virtual edge device) may be digitally signed using the private key of the key pair. The public key may be previously provided to any suitable component (e.g., the identity manager 1206, the resource manager 1208, etc.) and may be used along with the digital signature to validate that the request is authentic and unaltered.

In some embodiments, a single key pair may be generated for a physical edge device and shared by the virtual edge devices of that edge device. A combination of the compartment identifier corresponding to a virtual edge device and the public key of the key pair may be used to digitally sign any messages transmitted by a given virtual edge device and the receiving device (e.g., the edge device manager 1204, identity 1206, or any suitable component of a centralized cloud-computing environment may use the combination to validate the identity of the requesting virtual edge device and to ensure that the message provided by that virtual edge device is unaltered.

At 1228, the edge device manager 1204 may submit a request for a token from the identity manager 1206. In some embodiments, a token may be required to request data from any suitable resource manager (e.g., resource manager 1208). In some embodiments, the token (e.g., a resource provider session token indicates that the requesting entity utilizing the token has been verified by the identity manager 1206. In some embodiments, the submitted request may constitute a request to enroll and/or register the public/private key pair generated for the physical/virtual edge device(s) by the edge device manager 1204. In some embodiments, the request may include any suitable data such as the unique identifier for the physical/virtual edge device generated by the edge device manager 1204 and provided at 1212, a compartment or other storage location identifier, a tenancy identifier, or the like. Upon receiving the request, the identity manager 1206 may determine whether any preexisting access control policies exist for the edge device and/or an access group to which the edge device belongs (e.g., based on identifying an attribute of the edge device matches an attribute associated with the access group). In some embodiments, if the physical/virtual edge device(s) are not associated with any access control policies and/or no access control policies can be applied to the physical/virtual edge device(s), the identity manager 1206 may transmit data to the edge device manager 1204 indicating that the requested resource(s) are inaccessible to the edge device(s). If the requested resources are accessible to the edge device, the identify manager 1206 may generate and store a token as being associated with any suitable portion of the information received at 1228 (e.g., the edge device's unique identifier, a compartment identifier, a tenancy identifier, etc.).

At 1230, the identity manager 1206 may transmit the token it generated back to the edge device manager 1204.

At 1232, the edge device manager 1204 may execute operations for requesting access to a resource. By way of example, the edge device manager 1204 may execute a function call or application programming interface request to attempt to access the requested resource(s). As a non-limiting example, the edge device manager 1204 may an HTTP GET request that includes any suitable portion of the edge device information (e.g., the edge device's unique identifier, a compartment identifier, a tenancy identifier, etc.), the token obtained at 1230, and/or any suitable combination of the resource attributes (e.g., a storage bucket identifier, a container identifier, a file name, a file path, an image, etc.). In some embodiments, the resource manager 1208 may be configured to validate the token (e.g., with the identity manager 1206) before providing access to the requested resource. In some embodiments, the resource manager 1208 may allow access to the physical/virtual edge device in accordance with at least one access control policy maintained by the identity manager 1206 for the physical/virtual edge device or group to which the physical/virtual edge device belongs.

At 1234, the resource manager 1208 transmit any suitable data to the edge device manager 1204 indicating that access to the requested resources was allowed or denied. In some embodiments, the response transmitted at 1234 may include the requested resource.

At 1236, the edge device manager 1204 may store any suitable status information indicating whether access by the physical/virtual edge device to the requested resource was allowed or denied. In some embodiments, the edge device manager 1204 may update, at any suitable time, any suitable user interface presented at computing device 1202 to indicate this status.

At 1238, the computing device 1202 may fetch status information for the request from the edge device manager 1204 or otherwise receive a response to the request. The status information may indicate that the request was successful or unsuccessful and may be presented at any suitable user interface in any suitable manner. In some embodiments, receipt alone of the response may be used by the edge device manager 1204 as an indication that the resource is accessible to the edge device. A status indicator may be presented at the interface hosted by the edge device manager 1204. In some embodiments, the operations performed at 1222 to 1236 may be performed any suitable number of times according to any suitable number of requests and/or resources to which access is being validated. In some embodiments, the edge device manager 1204 may be configured to retry any suitable operations (e.g., the operations performed with respect to 1232) if a response has not been received after a predefined threshold period of time. The number of retries may be limited to a predefined number (e.g., 1, 2, etc.).

At 1240, a user may select an option to submit an edge device request for one or more physical edge devices which individually include any suitable number of virtual edge devices as determined from the device request. In some embodiments, the option to submit the edge device request may not become enabled for selection until all access to all requested resources has been validated. It should be appreciated that, in some embodiments, the any suitable combination of the data provided at 1212 and 1222 may be provided in a single request or in a greater number of requests than described above. In some embodiments, operations described in connection with 1210-1236 may be examples of the operations 1010-1014 of FIG. 10.

After the request is submitted at 1240, a manifest (e.g., manifest 1100) is generated at 1240. An administrator may view and approve the request via any suitable user interfaces provided by the edge device manager 1204. In some embodiments, the request may be electronically communicated (e.g., via email, text message, etc.) to an administrator for approval. Once approved (e.g., via the user interface or otherwise), a process for provisioning the edge device 1209 according to the generated manifest. In some embodiments, once the edge device 1209 is physically built, the manifest may be stored in local memory. Upon booting up, an agent on the edge device 1209 may be configured to begin the process of provisioning the edge device 1209 according to the manifest. In other embodiments, the resources specified in the manifest may be collected (e.g., by the edge device manager 1204) and stored in local memory at edge device 1209 at any suitable time.

At 1242, if the edge device 1209 does not already store its manifest, it may request it from the edge device manager 1204 at any suitable time.

At 1244, the edge device 1209 may generate a local key pair and may store this key pair in local memory (e.g., in a trusted platform module such as a chip, a hardware security module, an integrated circuit platform, or other hardware, firmware, and/or software for providing secure initialization of the edge device and security management of stored secrets, including encryption key(s)). The local key pair may be utilized for securing messages between any suitable combination of physical and/or virtual edge devices (e.g., physical/virtual edge devices associated with a common compartment/tenancy). In some embodiments, the operations performed at 1244 may include transmitting a public key of the local key pair to one or more other physical/virtual edge devices for subsequent use (e.g., to validate the identity of edge device 1209 and/or to verify that a message received from edge device 1209 is unaltered). In some embodiments, the edge device 1209 may utilize the private key of the local key pair to generate digital signatures of its outgoing messages.

At 1246, the edge device 1209 may obtain (e.g., from identity manager 1206) any suitable number of identifiers for each compartment/tenancy, physical edge device, and/or virtual edge device specified in the manifest. In some embodiments, the edge device 1209 may request (e.g., from identity manager 1206) a corresponding token for each resource specified in the manifest that enables the edge device 1209 to request data from any suitable resource manager (e.g., resource manager 1208).

At 1248, the edge device 1209 may utilize the identifiers and/or the tokens obtained at 1246 to obtain any suitable number of resources (e.g., objects, images, volumes, files, etc.) from any suitable number of resource managers (e.g., a block storage service, an object storage services, a container service, etc.). The edge device 1209 (or an agent of the edge device) may perform any suitable operations for installing and/or configuring the resources to execute and/or be otherwise utilized at the edge device 1209.

Figure 13:
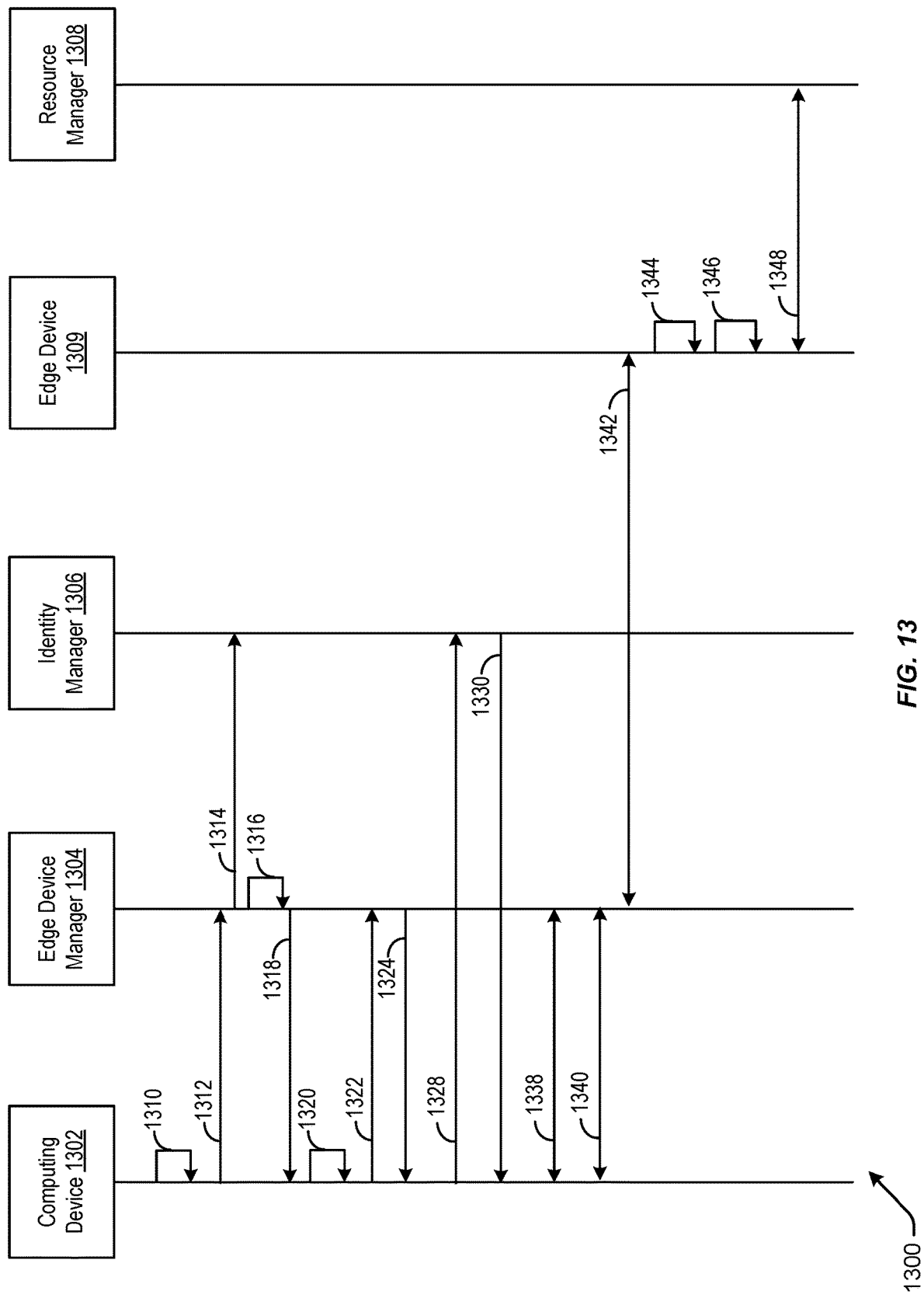
FIG. 13 is another block diagram illustrating another example method for provisioning an edge device with one or more virtual edge devices, according to at least one embodiment.

FIG. 13 is another block diagram illustrating another example method 1300 for provisioning an edge device with one or more virtual edge devices, according to at least one embodiment. Method 1300 may be performed with a computing device (e.g., computing device 1302, an example of user device 202 of FIG. 2) and an edge device manager 1304 (e.g., a computing component operating at the service provider computer 1002 of FIG. 10), an identity manager 1306, and a resource manager 1308. The computing device 1302, the edge device manager 1304, the identity manager 1306, the resource manager 1308, and the edge device 1309 may each be examples of the same component discussed above in connection with FIG. 12. The edge device 1309 may be an example of a physical or a virtual edge device. In some embodiments, at least one of: the edge device manager 1304, identity manager 1306, and/or resource manager 1308, is a service operating in the centralized cloud-computing environment.

Operations performed at 1310-1324 may be substantially similar to those discussed above at 1210-1224 of FIG. 12.

At 1328, the user may submit (e.g., to the identity manager 1306, directly, or via the edge device manager 1304) one or more access control policies. These policies may be provided at any suitable time. In some embodiments, the access control policies identify one or more physical and/or virtual edge devices, or device group identifiers (that are individually associated with one or more physical and/or virtual edge devices) that are to be allowed or denied access to a corresponding resource. In some embodiments, the one or more access control policies may be defined at a user interface provided by the edge device manager 1304 or the identity manager 1306 and presented at the computing device 1302.

At 1330, the identity manager 1306 may transmit a response that indicates the access control policies, corresponding to the data received at 1328, were generated and/or received successfully or unsuccessfully. The operations at 1328 and 1330 may be performed any suitable number of times.

The operations performed at 1338-1348 may be substantially similar or the same as the operations discussed above with respect to 1238-1248 of FIG. 12.

Figure 14:
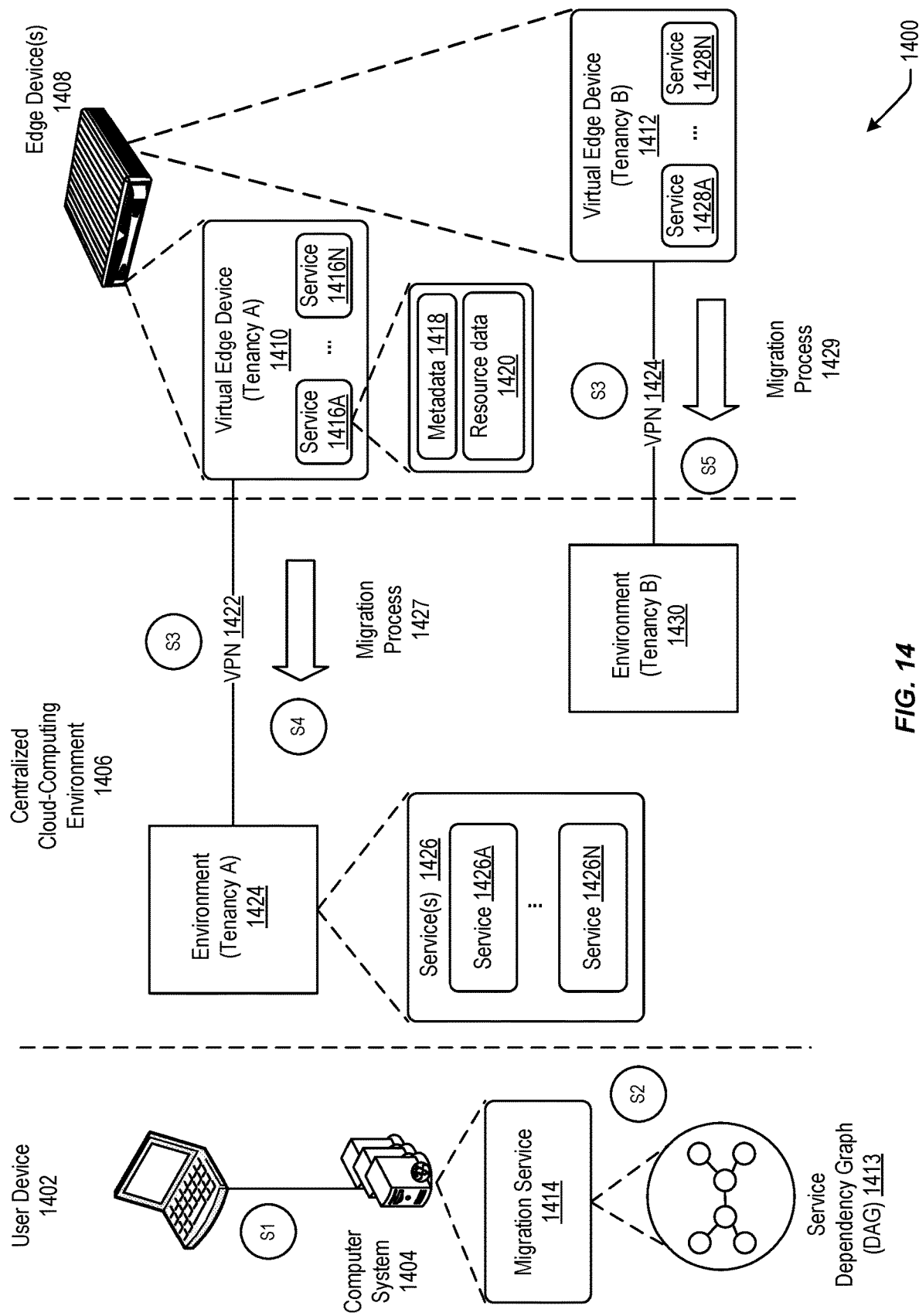
FIG. 14 is a block diagram illustrating an example environment for migrating a service from one or more virtual edge devices to a cloud computing environment, in accordance with at least one embodiment.

FIG. 14 is a block diagram illustrating an example environment 1400 for migrating a resource (e.g., a service, metadata, resource data, etc.) or any suitable data from one or more virtual edge devices to a cloud computing environment, in accordance with at least one embodiment.

In FIG. 14, several elements are depicted, including user device 1402 (e.g., a laptop, PC, etc.), computer system 1404 (e.g., a server device), a centralized cloud-computing environment 1406, and edge device(s) 1408 (e.g., which may correspond to any of the edge devices described in reference to FIGS. 1-7). Each of the edge device(s) 1408 may be configured with any suitable number of virtual edge devices (e.g., virtual edge devices 1410 and virtual edge device 1412, each an example of the virtual edge devices of FIGS. 8 and 9). In the illustration of FIG. 14, computer system 1404 and centralized cloud-computing environment 1406 may be associated with and/or managed by a cloud services provider.

As described further herein, the elements of FIG. 14 are depicted in association with performance of one or more operations of a migration process. For example, at step S1 of FIG. 14, a migration service 1414 of computer system 1404 may receive a request (e.g., from user device 1402, which may be associated with a particular customer of a cloud service provider) to migrate resources such as services, virtual machine instances ("instances," for brevity), workloads, state data, metadata, or the like, that currently reside at one or more edge device(s) 1408. In any of the examples provided herein, any reference to migrating one or more resources can equally apply to migrating instances, services, workloads, objects, files, state data, metadata, or any other transferable data entity, irrespective of whether such resources are service related. In some embodiments, the migration request may additionally or alternatively be received from any suitable combination of the edge device(s) 1408.

The edge device(s) 1408 may currently be provisioned to the particular customer for use in executing customer workloads via one or more resources. Using edge device 1410 as a representative example of the one or more edge device(s) 1408, edge device 1410 may execute one or more services (e.g., service 1416A-1416N). In some embodiments, a service (e.g., service 1416A, being a representative service) may be associated with, among other data elements/resources, metadata 1418 (e.g., including policy settings, access controls, etc.) and resource data 1420 (e.g., including files, folders, and/or other data objects). In some embodiments, a resource may be associated with any suitable computing workloads (e.g., hosting a web server to process web traffic, executing a machine learning algorithm to analyze data, storing customer data records, etc.). In some embodiments, a particular edge device (e.g., edge device 1410) may be associated with a particular hardware profile. For example, a hardware profile may indicate a number of CPU cores (e.g., 40 CPU cores) and/or a number of memory units (e.g., 512 Gigabytes). It should be understood that any suitable features may be associated with a hardware profile, including, but not limited to, CPU resources, memory resources, data bus types, disk storage types, network card types, other processor types (e.g., GPU resource), etc. A particular hardware profile of an edge device may enable the edge device to process data in accordance with workload requirements. For example, a particular processor unit type may enable efficient processing of data (e.g., images, video, etc.) by the edge device.

As described above, in some embodiments, edge device(s) 1408 may include a plurality of edge devices. The plurality of edge devices may be collectively configured to operate as a distributed computing cluster (e.g., connected together over a VPN), for example, similar to distributed computing cluster 600. In some embodiments, the distributed computing cluster may be used to execute an increased number of workloads among the devices of the cluster. In some embodiments, one or more services may be executed by each edge device to execute the workloads, and the services may (or may not) coordinate with each other.

Likewise, any suitable edge device of the edge device(s) 1408 may include any suitable number of virtual edge devices. In some embodiments, each virtual edge device may be associated with a same, or potentially differing, compartments/tenancies of the customer. As depicted in FIG. 14, virtual edge devices 1410 and 1412 are associated with "Tenancy A" and "Tenancy B," respectively. In some embodiments, some number of the virtual edge devices of any suitable number of edge device(s) 1408 may operate as a distributed computing cluster and may be used to execute an even further increased number of workloads among the virtual devices of the cluster and, by extension, the edge device(s) 1408.

In some embodiments, an edge device (and/or cluster of edge devices) may be associated with (e.g., belong to) a particular namespace. In some embodiments, a namespace may indicate a taxonomy for configuration data identities such that, for a particular namespace the identities are unique within the particular namespace. In some embodiments, the namespace may further be associated with (e.g., and/or provide a taxonomy for) any suitable data objects (e.g., VMs, files, etc.), relationships between objects, policies, resource data, attributes, identifiers, and the like, within the namespace.

In some embodiments, upon receiving the request to migrate services (and/or resources) from the edge device(s) 1408 (and/or from virtual edge device 1410), the migration service 1414 may obtain (e.g., access) a manifest file associated with the edge device(s) (and/or virtual edge device(s)) for which migration was requested at step S2. The manifest file may identify information associated with the edge device(s) 1408 (or virtual edge device 1410) that may be used by the migration service 811 to determine instructions for coordinating the service migration process. In some embodiments, the manifest file may indicate a list of resources (e.g., an inventory list) that are currently deployed to the edge device(s) 1408. It should be understood that any suitable information about the edge device(s) 1408 (and/or virtual edge devices 1410 and/or 1412) may be obtained to coordinate the migration process. The information may be obtained at any suitable time during the service migration process (e.g., upon receiving the request, after establishing a connection and/or private network (e.g., virtual private network (VPN) 1422 and/or 1424, etc.).

At step S3, the migration service 1404 may establish a communication channel between the edge device 1408 and the environment 1424. Environment 1424 is intended to depict any suitable centralized cloud-computing resource corresponding to the resources to be migrated from the edge device(s) 1408. By way of example, based at least in part on identifying (e.g., from the manifest), that virtual edge device 1410 is associated with "Tenancy A," the migration service 1404 may at least initiate a process by which a communication channel (e.g., VPN 1422) is established between a resource operating at the virtual edge device (e.g., service 1416A), and a corresponding centralized resource (e.g., service 1426A of Environment 1424, a resource that corresponds to the service 1416A and the tenancy "Tenancy A"). In a similar manner, migration service 1404 may establish a communication connection (e.g., VPN 1424) between virtual edge device 1412 and environment 1405. It should be understood that the communication channels discussed above may utilize any suitable one or more networks and/or mediums (e.g., the Internet, a private network, a WiFi network, Ethernet, etc.). In some embodiments, a different communication channel may be established between the virtual bootstrap environment and each of the edge device(s) 1408 being migrated.

At step S4, the migration service 1414 may execute a set of migration operations to coordinate the process for migrating resources (e.g., migration process 1427) between virtual edge device 1410 of edge device(s) 1408 and environment 1424 (e.g., over the VPN 1422). For example, the migration service 1414 may generate a service dependency graph 1415 that indicates an ordering of services that are to be eventually deployed environments 1424 and/or 1430. In some embodiments, the dependency graph 1415 may include a directed acyclic graph (DAG) of service dependencies. In some embodiments, as described above, the dependency graph may (or may not) include one or more of the core set of services of the centralized cloud-computing environment 1406. In some embodiments, the dependency graph may include nodes for services that have a counterpart service on edge devices and/or virtual edge devices being migrated. The dependency graph may further include nodes for additional services that do not have a counterpart service being migrated. In this way, the migration service 1414 may ensure that each service is ready to be deployed at the appropriate time/order (e.g., when other dependent services have been deployed). In some embodiments, the DAG may (or may not) differentiate between services that are being migrated and those that do not have a migrating counterpart. In some embodiments, the information used to generate the DAG may be obtained from one or more sources. For example, the DAG may be generated based in part on a manifest file received from the edge device(s) 1408, the virtual edge device 1410, from centralized cloud storage, and/or from a centralized cloud service (e.g., based at least in part on determining the manifest file (e.g., manifest 1100) corresponding to the edge device(s)/virtual edge device(s) to be migrated). (e.g., indicating what services are to be migrated).

In some embodiments, following the generation of the dependency graph, the set of migration operations may include facilitating a migration of each resource of the first set of services (and/or corresponding resources). For example, the migration service 1414 may iterate through each resource according to the dependency graph 1415 until all of the resources have been migrated from each edge device/virtual edge device, to its corresponding resource (e.g., service 1426A) within the corresponding environment (e.g., Tenancy A). In some embodiments, a validation process may be performed upon migrating services/resources to the virtual bootstrap environment 805 before migrating the services/resources to the dedicated region 803.

At step S5, similar operations may be performed as part of migration process 1429, a migration process corresponding to another edge device and/or virtual edge device of the edge device(s) 1408. By way of example, the resources of virtual edge device 1412 may be migrated to environment 1430 via VPN 1424. In some embodiments, the operations of migration processes 1427 and 1429 may be performed sequentially, or at least in part, concurrently.

In some embodiments, a validation process may be performed upon completion of the migration process 1427 and/or 1429 (and/or each service migration), to ensure that each service has been successfully migrated. Upon completing the end-to-end validation process, the migration service 811 may perform any suitable actions. For example, the migration service 1414 may cause the respective edge device (e.g., edge device 1410 and/or 1412) to be shut-down (and/or decommissioned) (e.g., through transmission of a command to shut down). In some embodiments, the migration service 1414 may shut down a particular resource (e.g., one of the set of services) on the edge device (e.g., via transmission of a command to shut down that particular service), once the service is confirmed to be successfully migrated.

Figure 15:
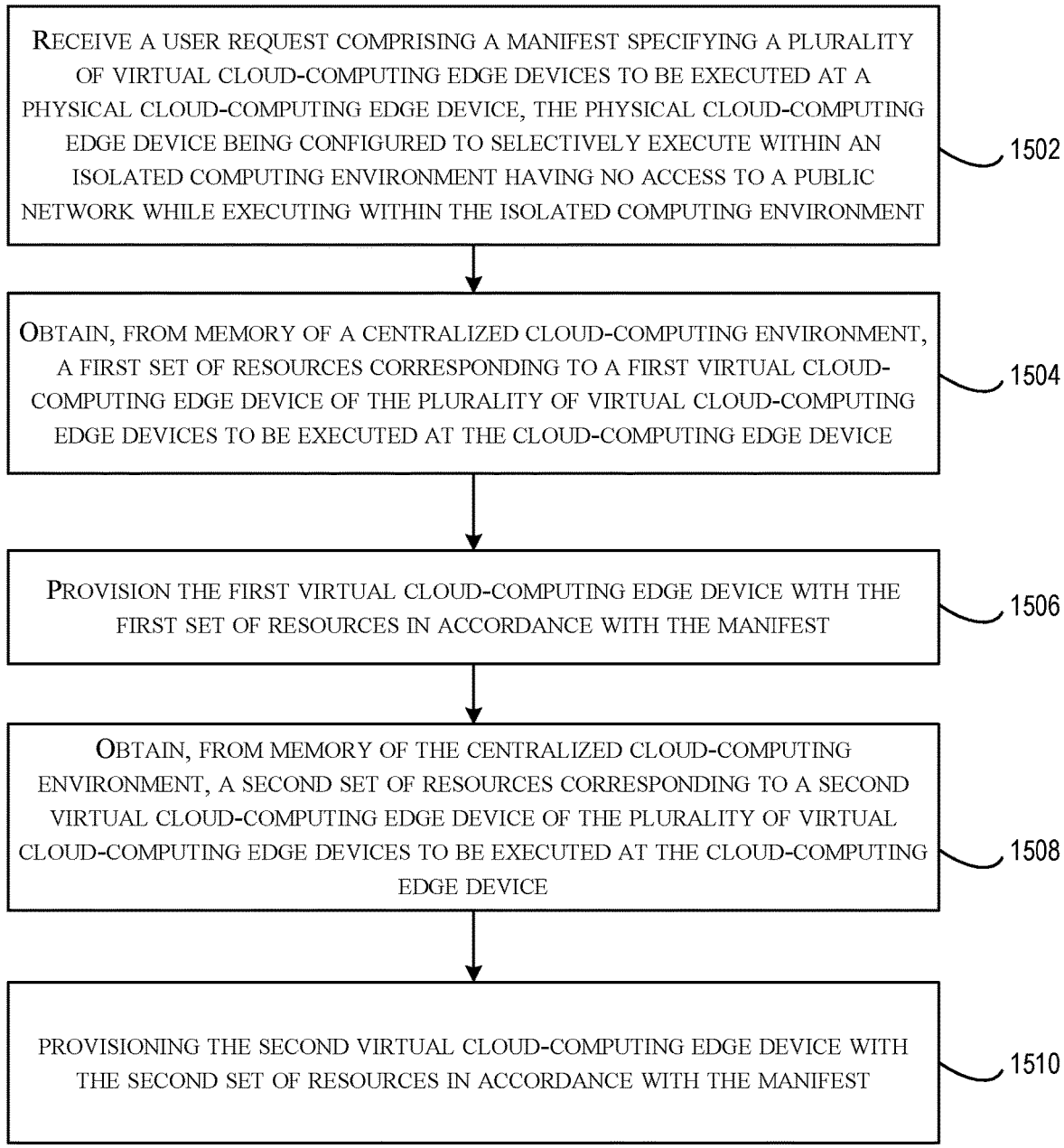
FIG. 15 is a block diagram illustrating an example method for managing a provisioning process of an edge device, in accordance with at least one embodiment.

FIG. 15 is a block diagram illustrating an example method 1500 for managing a provisioning process of an edge device (e.g., a physical edge device such as edge device 800 of FIG. 8), in accordance with at least one embodiment. The method 1500 may be performed by any suitable number of service provider computers (e.g., the service provider computers 1002 of FIG. 10). In some embodiments, the method 1500 may be performed by one or more virtual edge devices (e.g., the virtual edge device 802 and/or 804 of FIG. 8). In some embodiments, the service provider computer(s) are operated in a cloud-computing environment by a cloud-computing provider. The edge device and virtual edge devices may be communicatively coupled to the service provider computer(s) and/or the cloud-computing environment through one or more communication channels (e.g., respective virtual private networks). In some embodiments, each edge device and/or virtual edge device may be communicatively coupled via the channel to a corresponding compartment and/or tenancy. In some embodiments, the method 1500 may include more or fewer steps than the number depicted in FIG. 15. It should be appreciated that the steps of method 1500 may be performed in any suitable order.

The method 1500 may begin at 1502, where a user request comprising a manifest specifying a plurality of virtual cloud-computing edge devices to be executed at a physical cloud-computing edge device may be received by a cloud-computing device. As detailed above, the cloud-computing device in this example may be an example of the service provider computer(s) 1002 of FIG. 10 or an edge device such as edge device 802 of FIG. 8. In some embodiments, the physical cloud-computing edge device may be configured to selectively execute within an isolated computing environment having no access to a public network while executing within the isolated computing environment.

At 1504, a first set of resources (e.g., images, services, files, objects, volumes, containers, etc.) corresponding to a first virtual cloud-computing edge device of the plurality of virtual cloud-computing edge devices to be executed at the cloud-computing edge device may be obtained (e.g., from memory of a centralized cloud-computing environment). In some embodiments, this memory may be associated with a compartment and/or tenancy corresponding to a compartment and/or tenancy associated with the first virtual cloud-computing edge device (e.g., as identified from the manifest).

At 1506, the first virtual cloud-computing edge device may be provisioned with the first set of resources in accordance with the manifest.

At 1508, a second set of resources corresponding to a second virtual cloud-computing edge device of the plurality of virtual cloud-computing edge devices to be executed at the cloud-computing edge device may be obtained (e.g., from memory of the centralized cloud-computing environment). In some embodiments, this memory may be associated with a compartment and/or tenancy corresponding to a compartment and/or tenancy associated with the second virtual cloud-computing edge device (e.g., as identified from the manifest).

At 1510, the second virtual cloud-computing edge device may be provisioned with the second set of resources in accordance with the manifest.

Utilizing the techniques disclosed herein, the same physical hardware (e.g., an edge device) can be used multiple tenancies and/or compartments enabling users with multiple tenancies and/or compartments to condense workloads and/or resources to a single physical device.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    obtaining, by a cloud-computing edge device, a manifest specifying a distributed computing cluster comprising a plurality of virtual cloud-computing edge devices, the plurality of virtual cloud-computing edge devices comprising a virtual cloud-computing edge device corresponding to the cloud-computing edge device, the cloud-computing edge device being a physical device that is configured to execute within an isolated computing environment while lacking access to a public network;
    obtaining, by the cloud-computing edge device, a set of resources with which the virtual cloud-computing edge device is to be configured, the set of resources being specified in the manifest;
    obtaining, by the cloud-computing edge device, a credential for securing subsequent communications between the virtual cloud-computing edge device and an additional virtual cloud-computing edge device of the distributed computing cluster;
    configuring, by the cloud-computing edge device and in accordance with the manifest, the virtual cloud-computing edge device with the set of resources specified in the manifest and the credential, the virtual cloud-computing edge device being configured with the set of resources and the credential to execute as part of the distributed computing cluster comprising the plurality of virtual cloud-computing edge devices; and
    transmitting, by the cloud-computing edge device, the credential to at least one other cloud-computing device, the at least one other cloud-computing device being specified in the manifest and corresponding to at least one other virtual cloud-computing device of the distributed computing cluster.

2. The computer-implemented method of claim 1, wherein the virtual cloud-computing edge device is a first virtual cloud-computing edge device, wherein the cloud-computing edge device is configured with a second virtual cloud-computing edge device specified by the manifest, wherein the first virtual cloud-computing edge device is associated with a first tenancy of a centralized cloud-computing environment, and wherein the second virtual cloud-computing edge device is associated with a second tenancy of the centralized cloud-computing environment, the second tenancy being different from the first tenancy.

3. The computer-implemented method of claim 2, wherein the first virtual cloud-computing edge device is restricted from communicating with the second virtual cloud-computing edge device based at least in part on the first tenancy being different from the second tenancy.

4. The computer-implemented method of claim 1, wherein each virtual cloud-computing edge device of the distributed computing cluster corresponds to a respective cloud-computing edge device of a plurality of cloud-computing edge devices, the plurality of cloud-computing edge devices being individually configured to execute within the isolated computing environment while lacking access to the public network.

5. The computer-implemented method of claim 1, wherein the set of resources specified by the manifest are obtained from local memory of the cloud-computing edge device or from a resource manager of a centralized cloud-computing environment.

6. The computer-implemented method of claim 1, wherein obtaining the credential comprises generating, by the cloud-computing edge device, a key pair comprising a public key and a private key, and wherein the computer-implemented method further comprises:
    identifying, by the cloud-computing edge device and based at least in part on the manifest, the additional virtual cloud-computing edge device of the distributed computing cluster, the additional virtual cloud-computing edge device corresponding to a second cloud-computing edge device; and
    transmitting, by the cloud-computing edge device to the second cloud-computing edge device, the public key of the key pair, wherein transmitting the public key causes the additional virtual cloud-computing edge device to be configured to validate, with the public key, subsequent data transmitted by the virtual cloud-computing edge device.

7. The computer-implemented method of claim 1, further comprising requesting, by the cloud-computing edge device from a centralized cloud environment, one or more tokens with which the set of resources specified in the manifest are obtained.

8. The computer-implemented method of claim 1, further comprising:
    identifying, by the cloud-computing edge device and based at least in part on the manifest, the additional virtual cloud-computing edge device of the distributed computing cluster, the additional virtual cloud-computing edge device corresponding to a second cloud-computing edge device; and transmitting, by the cloud-computing edge device, the credential to the second cloud-computing edge device, wherein transmitting the credential causes the additional virtual cloud-computing edge device to be configured to validate, using the credential, subsequent data transmitted by the virtual cloud-computing edge device.

9. The computer-implemented method of claim 1, wherein the credential is a public key of a key pair generated by the cloud-computing edge device, the key pair comprising the public key and a corresponding private key.

10. The computer-implemented method of claim 1, wherein the distributed computing cluster is a first distributed computing cluster specified by the manifest, wherein the manifest further specifies a second distributed computing cluster comprising a second plurality of virtual cloud-computing edge devices, and wherein communication between the first distributed computing cluster and the second distributed computing cluster is restricted.

11. The computer-implemented method of claim 1, wherein obtaining the credential comprises generating, at the cloud-computing edge device, an encryption key.

12. A cloud-computing edge device, comprising:
one or more processors; and
one or more memories comprising computer-executable instructions that, when executed by the one or more processors, cause the one or more processors to:
 obtain a manifest specifying a distributed computing cluster comprising a plurality of virtual cloud-computing edge devices, the plurality of virtual cloud-computing edge devices comprising a virtual cloud-computing edge device corresponding to the cloud-computing edge device, the cloud-computing edge device being a physical device that is configured to execute within an isolated computing environment while lacking access to a public network;
 obtain a set of resources with which the virtual cloud-computing edge device is to be configured, the set of resources being specified in the manifest;
 obtain a credential for securing subsequent communications between the virtual cloud-computing edge device and an additional virtual cloud-computing edge device of the distributed computing cluster;
 configure, in accordance with the manifest, the virtual cloud-computing edge device with the set of resources specified in the manifest and the credential, the virtual cloud-computing edge device being configured with the set of resources and the credential to execute as part of the distributed computing cluster comprising the plurality of virtual cloud-computing edge devices; and
 transmit the credential to at least one other cloud-computing device, the at least one other cloud-computing device being specified in the manifest and corresponding to at least one other virtual cloud-computing device of the distributed computing cluster.

13. The cloud-computing edge device of claim 12, wherein the virtual cloud-computing edge device is a first virtual cloud-computing edge device, wherein the cloud-computing edge device is configured with a second virtual cloud-computing edge device specified by the manifest, wherein the first virtual cloud-computing edge device is associated with a first tenancy of a centralized cloud-computing environment, and wherein the second virtual cloud-computing edge device is associated with a second tenancy of the centralized cloud-computing environment, the second tenancy being different from the first tenancy, and wherein the first virtual cloud-computing edge device is restricted from communicating with the second virtual cloud-computing edge device based at least in part on the second tenancy being different from the first tenancy.

14. The cloud-computing edge device of claim 12, wherein each virtual cloud-computing edge device of the distributed computing cluster corresponds to a respective cloud-computing edge device of a plurality of cloud-computing edge devices, the plurality of cloud-computing edge devices being individually configured to execute within the isolated computing environment while lacking access to the public network.

15. The cloud-computing edge device of claim 12, wherein obtaining the credential causes the one or more processors to generate a key pair comprising a public key and a private key, and wherein executing the computer-executable instructions further causes the one or more processors to;
 identify, based at least in part on the manifest, the additional virtual cloud-computing edge device of the distributed computing cluster, the additional virtual cloud-computing edge device corresponding to a second cloud-computing edge device; and
 transmit, to the second cloud-computing edge device, the public key of the key pair, wherein transmitting the public key causes the additional virtual cloud-computing edge device to be configured to validate, with the public key, subsequent data transmitted by the virtual cloud-computing edge device.

16. A non-transitory computer-readable medium storing computer-readable instructions that, when executed by one or more processors of a cloud-computing edge device, causes the one or more processors to:
 obtain a manifest specifying a distributed computing cluster comprising a plurality of virtual cloud-computing edge devices, the plurality of virtual cloud-computing edge devices comprising a virtual cloud-computing edge device corresponding to the cloud-computing edge device, the cloud-computing edge device being a physical device that is configured to execute within an isolated computing environment while lacking access to a public network;
 obtain a set of resources with which the virtual cloud-computing edge device is to be configured, the set of resources being specified in the manifest;
 obtain a credential for securing subsequent communications between the virtual cloud-computing edge device and an additional virtual cloud-computing edge device of the distributed computing cluster;
 configure, in accordance with the manifest, the virtual cloud-computing edge device with the set of resources specified in the manifest and the credential, the virtual cloud-computing edge device being configured with the set of resources and the credential to execute as part of the distributed computing cluster comprising the plurality of virtual cloud-computing edge devices; and
 transmit the credential to at least one other cloud-computing device, the at least one other cloud-computing device being specified in the manifest and corresponding to at least one other virtual cloud-computing device of the distributed computing cluster.

17. The non-transitory computer-readable medium of claim 16, wherein the virtual cloud-computing edge device is a first virtual cloud-computing edge device, wherein the cloud-computing edge device is configured with a second virtual cloud-computing edge device specified by the manifest, wherein the first virtual cloud-computing edge device is associated with a first tenancy of a centralized cloud-computing environment, wherein the second virtual cloud-computing edge device is associated with a second tenancy of the centralized cloud-computing environment, the second tenancy being different from the first tenancy, and wherein the first virtual cloud-computing edge device is restricted from communicating with the second virtual cloud-computing edge device based at least in part on the second tenancy being different from the first tenancy.

18. The non-transitory computer-readable medium of claim 16, wherein each virtual cloud-computing edge device of the distributed computing cluster corresponds to a respective cloud-computing edge device of a plurality of cloud-computing edge devices, the plurality of cloud-computing edge devices being individually configured to execute within the isolated computing environment while lacking access to the public network.

19. The non-transitory computer-readable medium of claim 16, wherein obtaining the credential causes the one or more processors to generate a key pair comprising a public key and a private key, and wherein executing the computer-readable instructions further cause the one or more processors to;
    identify, based at least in part on the manifest, the additional virtual cloud-computing edge device of the distributed computing cluster, the additional virtual cloud-computing edge device corresponding to a second cloud-computing edge device; and
    transmit, to the second cloud-computing edge device, the public key of the key pair, wherein transmitting the public key causes the additional virtual cloud-computing edge device to be configured to validate, with the public key, subsequent data transmitted by the virtual cloud-computing edge device.

* * * * *